United States Patent
Pinkelman et al.

(10) Patent No.: US 11,702,015 B2
(45) Date of Patent: Jul. 18, 2023

(54) MORPHING TRUNK ORGANIZER USING SMA ENHANCED BI-STABLE STRIPS

(71) Applicant: Toyota Motor Engineering & Manufacturing North America, Inc., Plano, TX (US)

(72) Inventors: Brian J. Pinkelman, Ann Arbor, MI (US); Umesh N. Gandhi, Farmington Hills, MI (US); Ryohei Tsuruta, Ann Arbor, MI (US); Paul A. Gilmore, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 248 days.

(21) Appl. No.: 17/165,431

(22) Filed: Feb. 2, 2021

(65) Prior Publication Data
US 2022/0242328 A1 Aug. 4, 2022

(51) Int. Cl.
*B60R 9/06* (2006.01)
*B60R 7/02* (2006.01)
*B60R 7/08* (2006.01)

(52) U.S. Cl.
CPC ............... *B60R 9/065* (2013.01); *B60R 7/02* (2013.01); *B60R 7/08* (2013.01)

(58) Field of Classification Search
CPC .... B60R 7/02; B60R 7/08; B60R 9/06; B60R 5/04; B60R 2011/0036; F03G 7/065
(Continued)

(56) References Cited

U.S. PATENT DOCUMENTS 6,053,553 A * 4/2000 Hespelt .................. B60R 7/02
296/37.6
7,527,312 B1 * 5/2009 Cucknell .................. B60R 5/04
296/193.07
(Continued)

FOREIGN PATENT DOCUMENTS

CN 102765354 A * 11/2012 ............... B60N 3/08
DE 102008021679 A1 * 11/2008 ............. B60N 3/105
FR 3058108 A1 * 5/2018 ............ B60P 7/0892

OTHER PUBLICATIONS

FR-3058108-A1 machine translation.*
(Continued)

*Primary Examiner* — Dennis H Pedder
*Assistant Examiner* — Kevin P Weldon
(74) *Attorney, Agent, or Firm* — Christopher G. Darrow; Darrow Mustafa PC

(57) ABSTRACT

A cargo organizer is constructed from one or more bi-stable strips with at least one shape memory alloy (SMA) actuator per bi-stable strip. The cargo organizer can reside in the bi-stable strips elongated (flat) stable state and require little or no volume of the cargo compartment that it resides. Upon actuating a SMA actuator, the rapid conversion to the curved stable state can occur with the formation of a barrier to partition the cargo compartment into at least to portions. The transformation into the flat stable state removes the partition where the transformation can be via a second SMA actuator or manually. The cargo organizer can be incorporated into the cargo compartment in a manner that it translates from one site and orientation to one or more other sites or orientations by activation an actuator that can be an additional SMA actuator.

19 Claims, 18 Drawing Sheets

(58) Field of Classification Search
USPC .................. 296/37.1, 37.16, 24.4; 224/488
See application file for complete search history.

(56) References Cited

U.S. PATENT DOCUMENTS

| | | | | |
|---|---|---|---|---|
| 10,330,144 | B1* | 6/2019 | Alqasimi | F16C 11/12 |
| 10,682,931 | B2* | 6/2020 | Rowe | B60N 2/005 |
| 2002/0179663 | A1* | 12/2002 | Moore | B60R 7/02 |
| | | | | 224/539 |
| 2006/0265965 | A1* | 11/2006 | Butera | E05F 15/70 |
| | | | | 49/502 |
| 2010/0031525 | A1* | 2/2010 | Allezy | B32B 27/304 |
| | | | | 33/771 |
| 2010/0244505 | A1* | 9/2010 | Demick | B60R 11/0235 |
| | | | | 296/37.16 |
| 2016/0375835 | A1* | 12/2016 | Murray | B60R 7/02 |
| | | | | 296/37.1 |
| 2019/0291649 | A1* | 9/2019 | Ito | B60R 7/02 |
| 2022/0316458 | A1* | 10/2022 | Tsuruta | F03G 7/065 |

OTHER PUBLICATIONS

Jitosho R. et al., "Exploiting Bistability for High Force Density Reflexive Gripping," International Conference on Robotics and Automation (ICRA) 2019, 7 pages.

Cazottes, P. et al., "Bistable Buckled Beam: Modeling of Actuating Force and Experimental Validations," J. Mech. Design, vol. 131 (2009), 10 pages.

Cazottes et al., "Design of Actuation for Bistable Structures Using Smart Materials," Advances in Science and Technology, vol. 54 (2008) pp. 287-292 (1st Page/Abstract only).

Cazottes P. et al., "Actuation of bistable buckled beams with Macro-Fiber Composites," IEEE/RSJ International Conference on Intelligent Robots and Systems (2008) p. 564-569.

* cited by examiner

FIG. 31
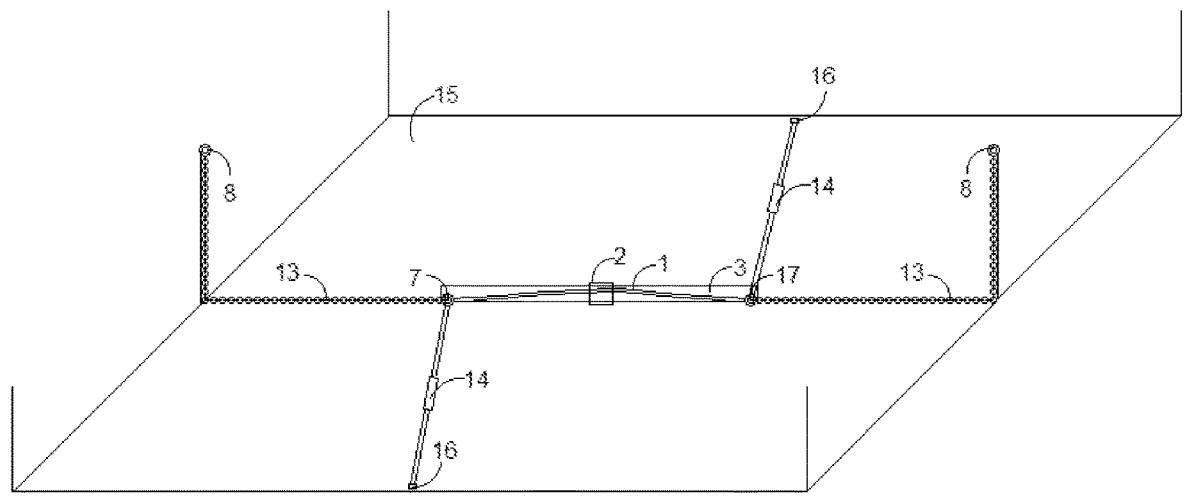
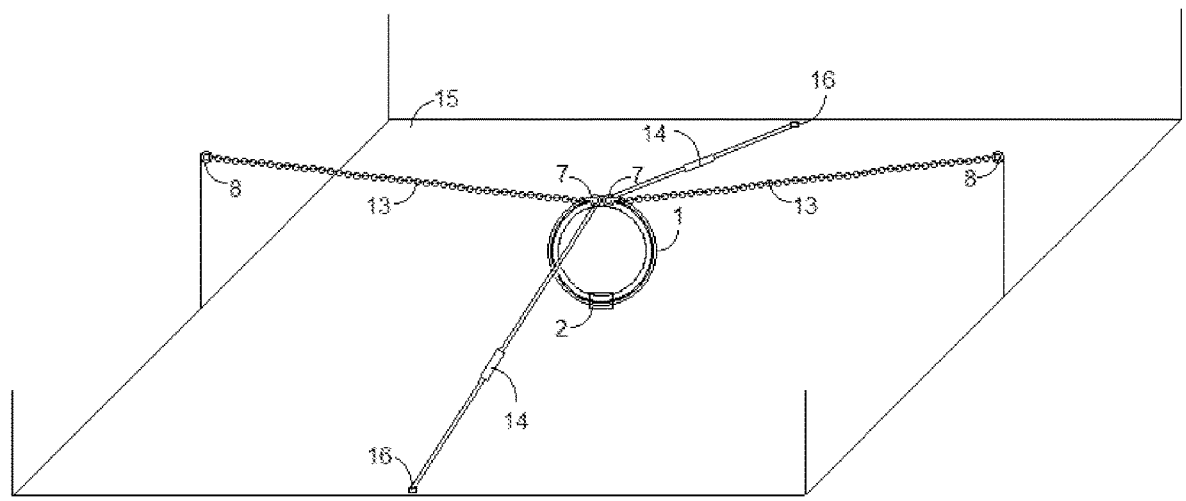

MORPHING TRUNK ORGANIZER USING SMA ENHANCED BI-STABLE STRIPS

TECHNICAL FIELD

The present disclosure generally relates to a device incorporated in a vehicle's cargo space to partition the volume for organizing the compartment for the securing of the cargo.

BACKGROUND

Bi-stable strips mechanisms use deflection to store and release energy between two distinct stable states of the strip, generally a straight and a curved shape. The two states retain their passive shapes without actuation, and generally resist a change in shape by small momentum transfer upon contact with an object. Bi-stable strips are useful where switching from one shape to the other shape is actuated by a force only to change shape. These mechanism have been used for many "low-tech" applications, such as ornamental "slap-bracelets" to "high tech" applications such as microgrippers in binary robotic devices that require ready compliance as well as bi-stability in a cost-effective manner.

As shown in FIG. 1, a typical bi-stable strip is a spring steel defined by a long axis with a positive curvature perpendicular to the long axis, curving the short axis, to form a shape that can be described as a portion of a height of a cylinder that includes less than 180 degrees of the circumference. This quasi-flat elongate state with a perpendicular curvature to the long axis constitutes a first stable state. The second stable state of the bi-stable strip is where the strip curves perpendicular to the short axis, wrapping the long axis at least partially along the diameter of a short cylinder having the height of the short axis. The bi-stable strip can be formed by plastic deformation and bending during a heat treatment of a metal strip to the first stable state. As both the first and second states are stable, force is only required for transformation between these states and not the maintenance of the shapes.

Shape memory alloys (SMAs) are a group of metallic alloys that can be changed in shape or size but can return to an original shape or size when actuated. This transformation phenomenon is known as the shape memory effect (SME). The SMA transforms from a martensitic (M) phase to austenitic (A) phase on heating and A→M on cooling in a reversible manner with thermal energy converting into mechanical work. Hence, an SMA deformed under an external force recovers its original shape by heating to or beyond a designed transition temperature based on the specific composition employed. The heating can be carried out by Joule heating upon imposing a current through the SMA article where the shape transformation occurs very rapidly upon heating.

Vehicle trunk organizers generally involve multiple parts and hinges, nets, fasteners, and other features that require some assembly and often sacrifice significant storage room when not in use. Yet, even with the best designs, the subdividing of storage compartments can inconveniences filling the compartment when its maximum unencumbered volume is needed. An organizer that can be readily reduced to a volume and/or a position that does not compromise use of the largest available cargo volume is desirable. An organizer that can have different degrees of partitioning and can be placed in any of its possible configurations with little effort, even automatically, in a matter of seconds is highly desirable. To such an end, the use of an organizer that can take advantage of the two stable structures of a bi-stable strip and the ease of actuation afforded by an SMA is of interest.

SUMMARY

This section provides a general summary of the disclosure and is not a comprehensive disclosure of its full scope or all its components.

In various aspects, the present teachings provide a retractable cargo organizer that can be embedded in the base, sides, and/or cover of a storage compartment in a vehicle, such as the floor, side walls, and lid of a car's trunk. The retractable cargo organizer includes at least one bi-stable strip and at least one actuator including a shape memory alloy (SMA) that can be heated by the application of a controlled electrical current to heat to a temperature where the SMA transformed to its austenitic (A) phase. The SMA can be in the form of a wire, a strip, a spring, or a plate, depending upon how it is positioned with respect to the bi-stable strip. In this manner, the cool SMA can be heated for a short period of time, for example, about 0.5 to about 2 seconds, by an applied voltage such that an uncoiling of the bi-stable strip occurs where the A phase is in the uncoiled shape complementary to the bi-stable strips elongated shape. A second SMA can be heated to promote the transformation to its A phase and bias the bi-stable strip to the coiled state by imparting a stress on curvature perpendicular to the length of the bi-stable strip while in the uncoiled elongated (flat) state. The attachment of the bi-stable strip at one or more positions of the bi-stable strip to on one or more positions on the surface of the vehicle's storage compartment, either directly to or in a surface of the trunk or through one or more positions of the cargo organizer with an extender that is ultimately attached in a fixed or movable manner to a surface or embedded within a surface of the trunk. The attachment is in a manner that the organizer can contract to a shape that is effectively flat, where the bi-stable strip has some curvature perpendicular to its length and requires little or any of the volume that would be available for cargo absent the organizer. The transformation between the two stable states of the bi-stable strip is actuated using at least one SMA actuator or in a manual manner as desired. Actuation and transformation occur in seconds or less, and the SMA activation is controlled such that sufficient heat is supplied, but limited to a degree where the temperatures reached by the SMAs and transferred through insulating coverings are insufficient to damage cargo.

In another aspect, the present teachings provide a vehicle having a trunk or other cargo component that can be organized into compartments partitioned from the full volume to one with one or more barriers to movement of cargo with transformation upon actuation of a cargo organizer. The trunk's cargo organizer(s) convert the trunk from a single open compartment by forming barriers that restrict cargo to one portion of the trunk with a transformation from the single compartment to plural compartments in seconds by actuation of the cargo organizers. The cargo organizer is actuated by the application of an electrical current. By switching on a controlled current, one or more SMA components of the cargo organizer undergoes joule heating of the SMA to cause a transformation of a M phase to an A phase such that the with the shape change imposed by the SMA that places a force on a bi-stable strip to cause the coiling of a bi-stable strip. Prior to the activation of the SMA component, the cargo organizer resides on or within the trunk's floor, walls, or lid.

Further, the present teachings provide a method of organizing a cargo compartment by actuating a SMA actuator that imposes a force that promotes the transformation from one stable state of a bi-stable strip to the other stable state. Upon actuation partitions are established that rise from a base, sides, and or top of a trunk or other cargo compartment. The actuation can require less than about a second to form the stable partition from an organizer that requires little or none of the volume of the cargo compartment in its fully un-partitioned state, where the organizers reside as an elongated, nearly flat strip that resides on or in a trunk's surface with little or no protrusion into the maximum unpartitioned volume. One or more SMA actuators comprises a nitinol or other SMA material known in the art that can be actuated by Joule heating upon application of an electrical current through the SMA material that in its A state is a coiled wire or strip. In this case, an M to A transformation occurs with the contraction of the SMA material to move into a curved state from its flat state. In the curved state, the partitions are stable and remain in that stable state of the bi-stable strip if struck at an angle that is not perpendicular to the curvature. The separated cargo is parallel to the axis of the curvature of the bi-stable strip such that shifting of the cargo does not result in an actuation. The cargo organizer can be collapsed on demand, either by actuating one or more second SMA, for example, one or more SMA strips that contract when heated to impose a force on the curvature of a bi-stable strip perpendicular to the bi-stable strip's length to contract and transfer the bi-stable strip to its elongated state. This transformation can also be actuated by applying a mechanical force on the curved state to collapse it to its elongated state. The mechanical force can be applied manually by a human hand.

BRIEF DESCRIPTION OF THE DRAWINGS

The present teachings will become more fully understood from the detailed description and the accompanying drawings, wherein:

FIG. 3I shows a drawing of a cargo compartment 15 containing the cargo organizer of FIG. 3G which partitions the front from the back portions of the cargo compartment on actuation and where the bi-stable strip 3 is attached at both ends to connecting telescopic rods 14 by strip hinges 7 that are attached with rings 16 to the mid-point of the front and back walls of the cargo compartment 15 that form partitions of the left and right portions to generate four quadrants in the cargo compartment 15, according to an embodiment.

It should be noted that the figure set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate components from a combination of figures.

DETAILED DESCRIPTION

Figure 1:
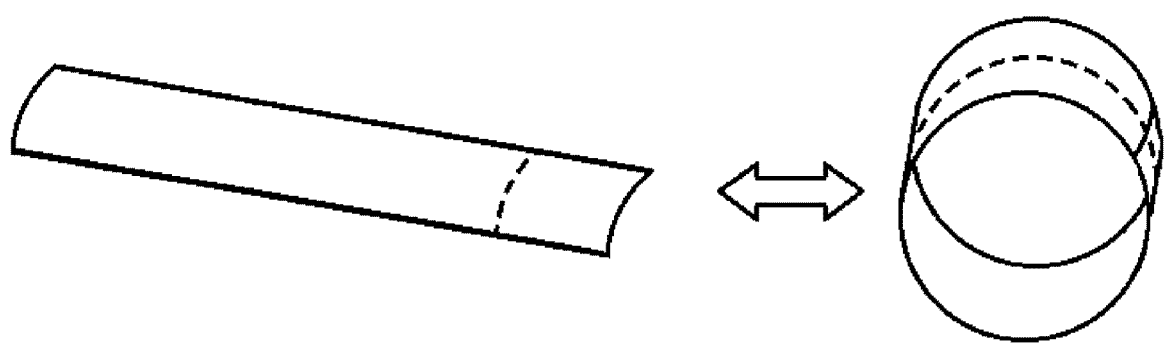
FIG. 1 is drawing of a bi-stable strip in an elongated stable state with a curvature perpendicular to the long axis of the partial cylinder (left) that can be transferred to a cylindrical stable state where the long portion has curved into a full cylinder, where the curvature is perpendicular to the curvature from the elongated state.

The present technology provides a retractable cargo organizer for a trunk, a truck bed, or other cargo or storage compartment of a vehicle. The vehicle can be an automobile, pick-up truck, SUV, or any other vehicle, including a train, plane. When the compartment is to be employed without partitioning of its maximum volume, the cargo organizer is retracted into a linear strip that can be embedded in the base, sides, and or cover of the storage compartment. For example, the cargo organizer can be embedded in the vehicle's floor and can elevate from the floor upon actuation to partition a trunk to segregated cargo to a portion of the trunk. One or more cargo organizer, additionally or alternatively to a cargo organizer situated on the floor, can be situated on one or more side walls of the trunk. The vehicle's trunk lid can have a cargo organizer that can be actuated after closing to impose a force on the cargo to press it securely to the base of the cargo compartment. As shown in FIG. 1, the retractable cargo organizer includes at least one bi-stable strip (3) which is actuated by at least one shape memory alloy (SMA) actuator (1) and (2) that can be heated by the application of a controlled electrical current to the SMA to increase its temperature to at least a memory temperature where the SMA transformed to an austenitic (A) phase (1A) and (2A) from a martensitic (M) phase (1M) and (2M). As shown in FIG. 1, by heating a pair of SMA strips, 2M that are in a M phase a force is imparted perpendicular to the curvature of the bi-stable strip in a first stable state that is elongated where the contraction of the strips to actuate the flipping of the bi-stable strip to a curved state. Although shown with a pair of SMA strip actuators, one is sufficient for actuation of the bi-stable strip. The heating is only for a short period of time, for example, about 0.5 to about 2 seconds, by an applied voltage. A second SMA actuator in the form of a wire, 1M, can be heated to promote the transformation to its A phase and bias the bi-stable strip 3L to coiled to its second bi-stable state 3C. The SMA actuator can be connected directly to a wire or other electrically conductive connection to provide a current for Joule heating of the SMA actuator. The conductive connection can include a switch that upon the transformation to the second stable state disconnects the connection automatically preventing actuating more than one SMA actuators to a common bi-stable strip simultaneously even if the circuit for actuating the cargo organizer has a single connection to the power source.

Figure 3A:
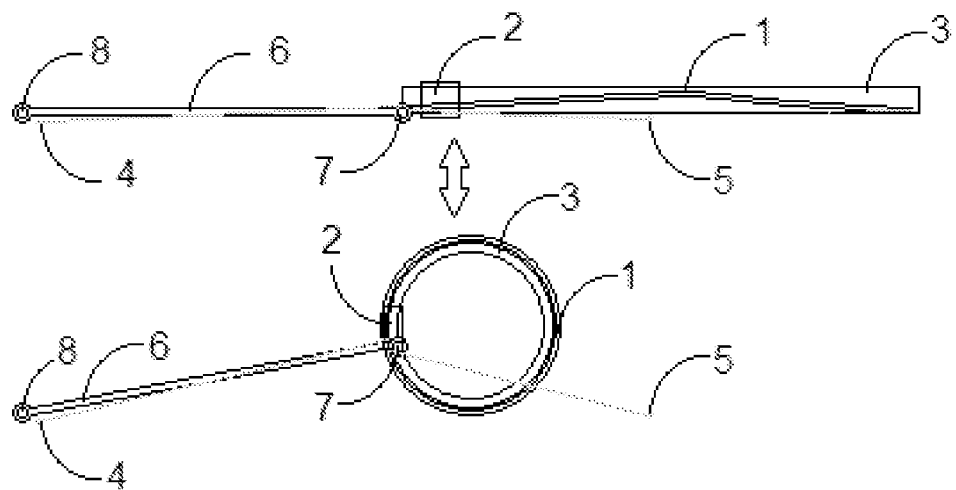
FIG. 3A shows a drawing of a cargo organizer in the form of a flat (elongated) bi-stable strip 3 attached to a SMA strip 2 that actuates transformation to the curved stable state upon receipt of current through a conductor 4 and SMA wire 1 that actuates transformation to the elongated bi-stable state upon receipt of current through a conductor 5 with a connecting rod 6 that makes a single fixed attachment with a compartment hinge 8 to the floor of a cargo compartment and attached to the bi-stable strip 3 through a strip hinge 7, according to an embodiment.
Figure 3B:
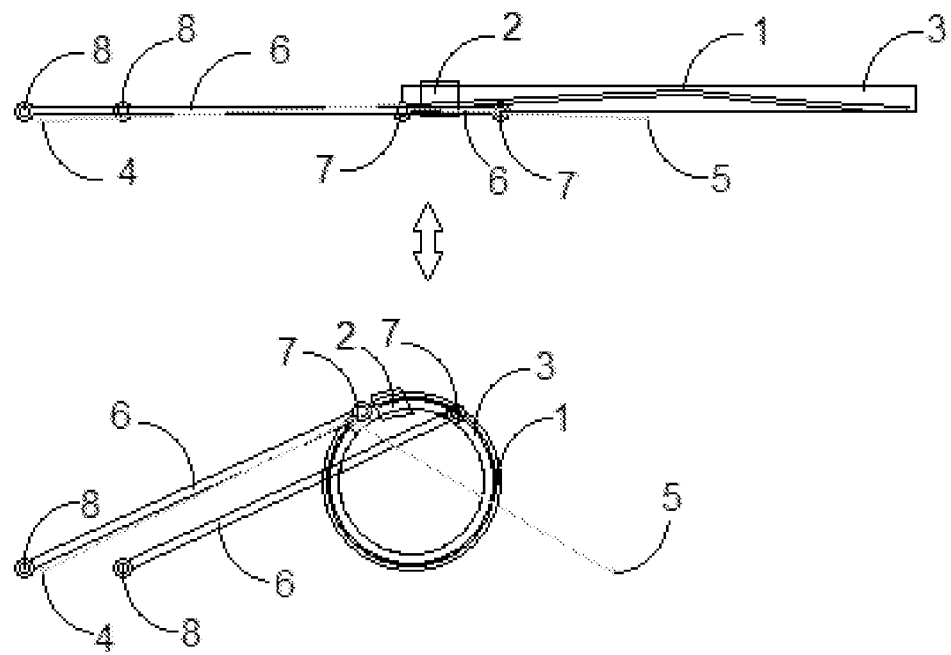
FIG. 3B shows a drawing of a cargo organizer in the form of a flat (elongated) bi-stable strip 3 attached to a SMA strip 2 that actuates transformation to the curved stable state upon receipt of current through a conductor 4 and SMA wire 1 that actuates transformation to the elongated bi-stable state upon receipt of current through a conductor 5 with a first connecting rod 6 that makes a first fixed attachment with the floor of a compartment hinge 8 to the cargo compartment and attached to the bi-stable strip 3 through a first strip hinge 7 and a second connecting rod 6 that makes a second fixed attachment to the floor with a second compartment hinge 8 and attached to the bi-stable strip 3 through a second strip hinge 7, according to an embodiment.

In an embodiment, the bi-stable strip can be attached at one or more positions of the bi-stable strip (3), as exemplary shown in FIG. 3A and FIG. 3B for attachment of one or two rods (6) to positions near one end of the bi-stable strip where a second rod 6 can be attached to the bi-stable strip 3 at a point that is not on or near an end and the rods 6 are fastened on the surface of the vehicle's storage compartment, for example the floor. The connections, orientations, and mode of the rods and their function can amplify the extent to which the organizer extends in space to establish a barrier in the cargo compartment. As shown in FIG. 3A, connection can be by a single ridged rod 6 and the bi-stable strip 3, which is shown to form, a complete circle in a profile down the axis. The ridged connecting rod 6 can be attached where hinges 7 and 8 are situated at both ends of the rod with one end to a strip hinge 7 attached to the bi-stable strip 3 and one end to a compartment hinge 8 attached to the cargo compartment and can be attached permanently, or via a pin at each axle such that removal, cleaning, and reassembly can be performed at will. The ridged rod 6 can be a pair of rods that are parallel on each side of the bi-stable strip 3. The rod 6 functions as part of the cargo divider when the cargo organizer in the elevated stable coiled position.

As shown in FIG. 3B, two rods 6, one attached at an end and another attached at a position along the length of the bi-stable strip 3 form a barrier with four points of attachment in the cargo organizer and the cargo compartment. The rods 6 do not need to be of equal length to function on this manner, but the length will be defined by the point of attachment on the bi-stable strip 3 and the point of attachment to the trunk floor required to allow the desired elevation designed.

Figure 3C:
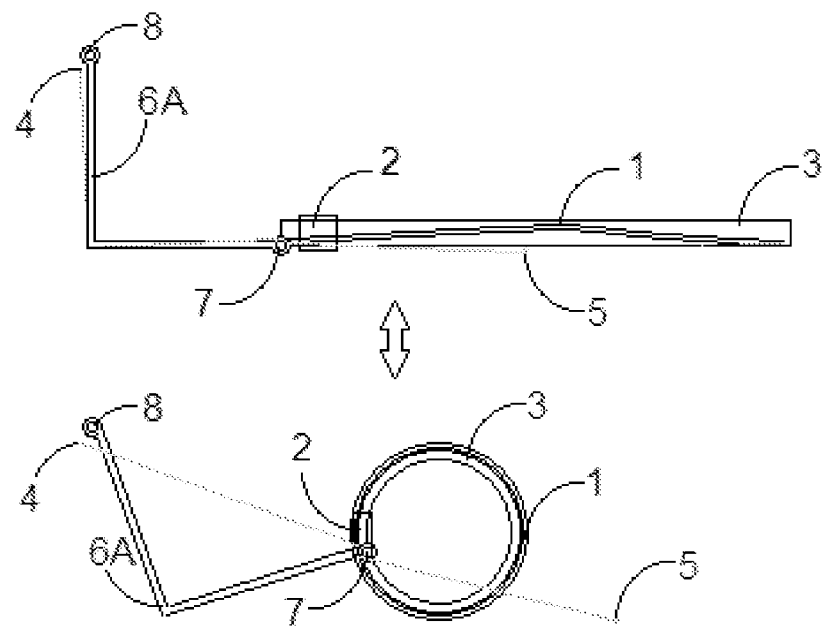
FIG. 3C shows a drawing of a cargo organizer in the form of a flat (elongated) bi-stable strip 3 attached to a SMA strip 2 that actuates transformation to the curved stable state upon receipt of current through a conductor 4 and SMA wire 1 that actuates transformation to the elongated bi-stable state upon receipt of current through a conductor 5 with an angled connecting rod 6A that makes a single fixed attachment with a compartment hinge 8 to the cargo compartment and attached to the bi-stable strip 3 through a strip hinge 7, according to an embodiment.
Figure 3D:
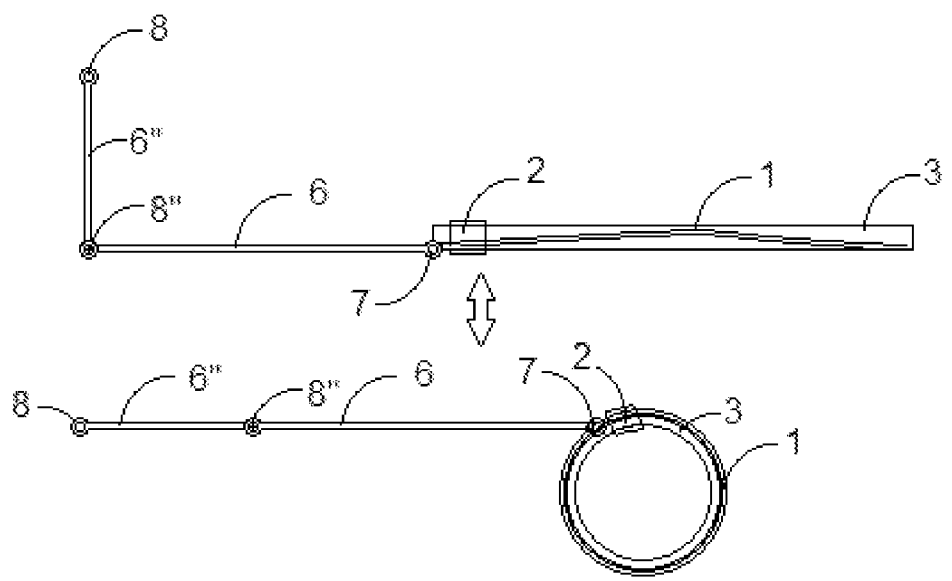
FIG. 3D shows a drawing of a cargo organizer in the form of a flat (elongated) bi-stable strip 3 attached to a SMA strip 2 that actuates transformation to the curved stable state upon receipt of current through a conductor 4 and SMA wire 1 that actuates transformation to the elongated bi-stable state upon receipt of current through a conductor 5 with a connector hinge 8" pairing a second connecting rod 6" to a first connecting rod 6 that makes a single fixed attachment with a compartment hinge 8 to the side wall of a cargo compartment and attached to the bi-stable strip 3 through a strip hinge 7, according to an embodiment.
Figure 3E:
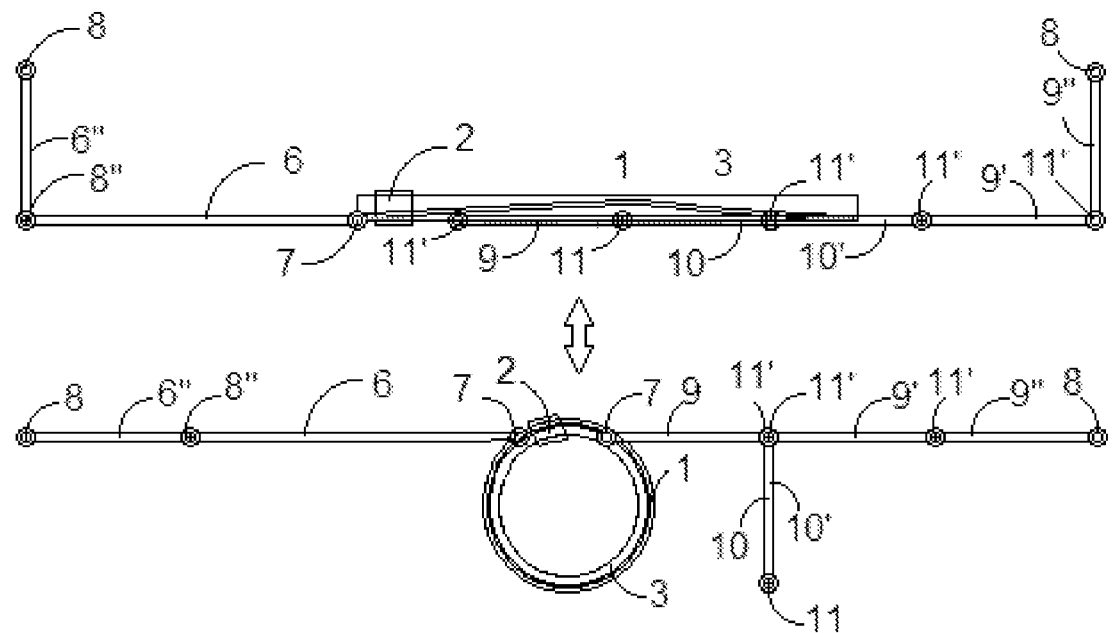
FIG. 3E shows a drawing of a cargo organizer in the form of a flat (elongated) bi-stable strip 3 attached to a SMA strip 2 that actuates transformation to the curved stable state upon receipt of current and a SMA wire 1 that actuates transformation to the elongated bi-stable state upon receipt of current through a conductor with a connector hinge 8" pairing a second connecting rod 6" to a first connecting rod 6 that makes a pair of fixed attachment with a first compartment hinge 8 to the side wall of a cargo compartment and attached to the bi-stable strip 3 through a strip hinge 7 and a second fixed attachment to an opposite sidewall through a second compartment hinge 8 were a five part connecting rod (9, 9', 9", 10, and 10') connected through a series of connector hinges (11 and 11') organizes to form a floor perpendicular barrier from two connectors 10,10' upon actuation to the curved stable state, according to an embodiment.

The rod can have a curvature or fixed angle, and is shown as an angled connecting rod 6A in FIG. 3C, such that attachment to the vehicle assumes the surface geometry of the trunk allowing a single attachment to be made to a sidewall without imposing a barrier of any portion of the cargo compartment when the bi-stable strip 3 is in the fully extended state. As shown in FIG. 3D, an additional connector hinge 8" (axle), or its equivalent, such a plastic hinge or elastomeric portion, can be situated at a length of the two-part connecting rod (6, 6") such that it resides in a corner of the compartment until the bi-stable strip 3 is actuated into the elevated position and where a point on the bi-stable strip 3 can move freely, as shown, or be fixed to the floor of the cargo compartment. As shown in FIG. 3E, two composite rods (6, 6", 9, 9', 9" 10, 10') with additional hinges (8", 11, 11') can be attached to the bi-stable strip 3 and the side walls or front and back walls such that upon actuation the two composite rods 6, 6", 9, 9', 9" form a nearly colinear barrier parallel to the floor with one perpendicular rod feature 10, 10' within the plane defined by the coiled bi-stable strip 3, such that a single cargo organizer can partition the cargo compartment into two portions. Again, the bi-stable strip 3 can be attached directly to the floor but is not necessarily attached to the floor. Additional features that extend in the plane perpendicular to the axis of the curved bi-stable strip can formed by further segmentation of the connecting rods.

Figure 3F:
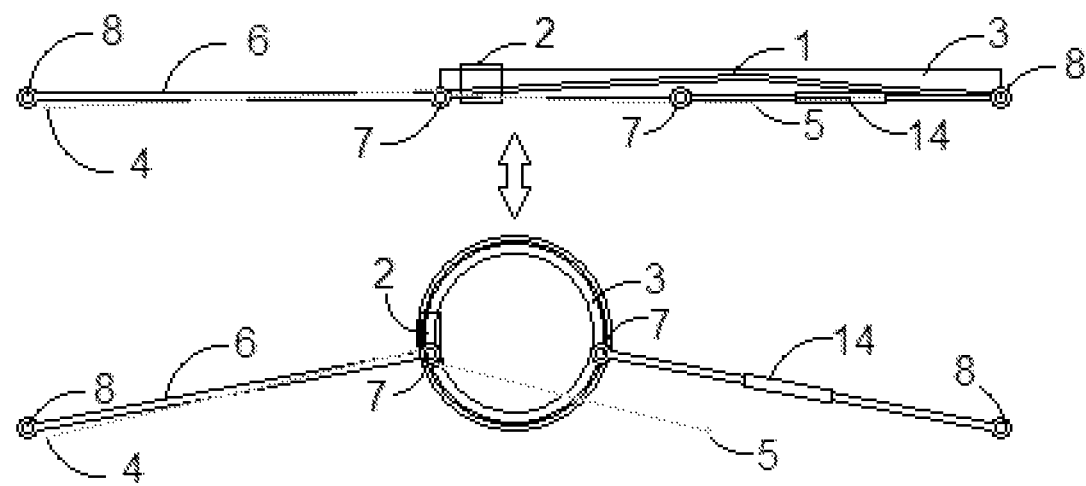
FIG. 3F shows a drawing of a cargo organizer in the form of a flat (elongated) bi-stable strip 3 attached to a SMA strip 2 that actuates transformation to the curved stable state upon receipt of current through a conductor 4 and SMA wire 1 that actuates transformation to the elongated bi-stable state upon receipt of current through a conductor 5 with a first connecting rod 6 that makes a first fixed attachment with the floor of a compartment hinge 8 to the cargo compartment and attached to the bi-stable strip 3 through a first strip hinge 7 and a second connecting telescopic rod 14 that makes a second fixed attachment to the floor with a second compartment hinge 8 and attached to the bi-stable strip 3 through a second strip hinge 7, according to an embodiment.
Figure 3G:
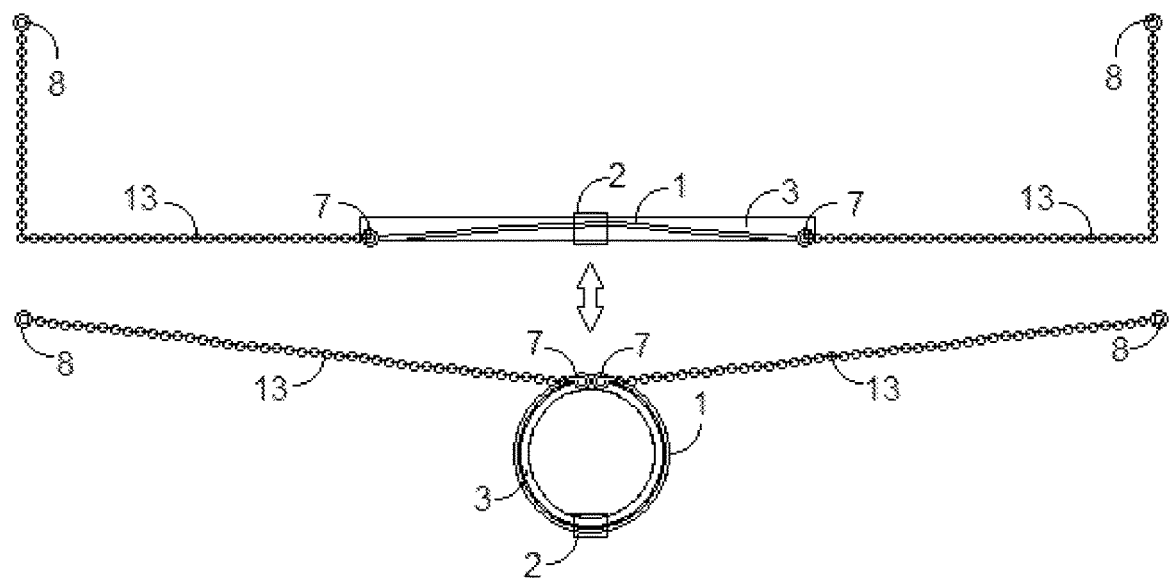
FIG. 3G shows a drawing of a cargo organizer in the form of a flat (elongated) bi-stable strip 3 attached to a SMA strip 2 that actuates transformation to the curved stable state upon receipt of current and a SMA wire 1 that actuates transformation to the elongated bi-stable state upon receipt of current with two connector chains 13 of fixed attachment with compartment hinges 8 to the opposing side walls of a cargo compartment and attached to the bi-stable strip 3 through a two strip hinges 7, according to an embodiment.

As shown in FIG. 3F, a first fixed ridged rod 6 and a second telescopic rod 14 can be attached to the bi-stable strip 3 and to the floor of the trunk where the second telescopic rod 14 can be a rod sliding in a tube, or employ an elastomeric, though with sufficiently low resistance to elongation to allow activation of the elongation of the bi-stable strip, such that fixed attachment to any position of the bi-stable strip can be made. Using a flexible strip or a chain 13 attached on ends of a bi-stable strip 3 a partition can be formed when a flat bi-stable state transforms, for example, when chains 13 are attached to the back wall and front wall of the trunk with a barrier height of a continuous barrier being approximately the diameter of the curved bi-stable state or more when activated, as illustrated in FIG. 3G.

Figure 3H:
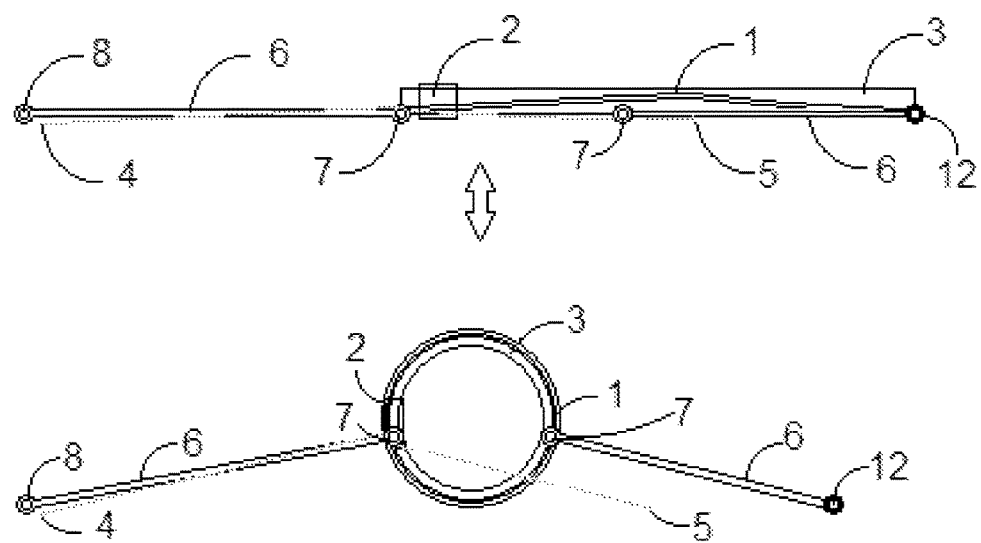
FIG. 3H shows a drawing of a cargo organizer in the form of a flat (elongated) bi-stable strip 3 attached to a SMA strip 2 that actuates transformation to the curved stable state upon receipt of current through a conductor 4 and SMA wire 1 that actuates transformation to the elongated bi-stable state upon receipt of current through a conductor 5 with a first connecting rod 6 that makes a first fixed attachment with the floor of a compartment hinge 8 to the cargo compartment and attached to the bi-stable strip 3 through a first strip hinge 7 and a second connecting rod 6 that connects to a wheel 12 and attached to the bi-stable strip 3 through a second strip hinge 7, according to an embodiment.

Additional connection between the trunk and the bi-stable strips can be made. One or more of a plurality of ridged rods 6, or other connectors, can be fixed to the bi-stable strip 3 where one end of the rods 6 can included a wheel 12 to roll across the surface of the trunk's floor or in a channel to permit movement towards the point of attachment on the bi-stable strip or the surface of the cargo compartment as shown in FIG. 3H. Rods, chains, or elastomers can also be employed with attachment perpendicular to the cargo organizer such that more than two partitions, for example four quadrants, can be formed, where, as shown in FIG. 3I, two telescopic rods 14, or elastomeric strips or chains are attached to the bi-stable strip such that on activation they are drawn perpendicular to the curved axis of the curved bi-stable strip 3. Though shown for a rectangular cargo compartment with perpendicular side walls, this geometry is for illustrative purposes and is not limiting to the shape of the cargo compartment, as the connecting features can conform to nearly any cargo compartment shape. The quantity of rods, elastomers, chains, telescopic rods, flexible rods, per bi-stable strip and the number of bi-stable strips per organizer can be of any number, so that the cargo compartment can be partitioned in any manner possible considering the number of cargo organizers included, which can be one to twenty or more, as any to all the cargo organizers can be actuated individually and selectively. Attached or included with any connecting rods, elastomers, chains, telescopic rods, flexible rods can be rolled, folded, or elastic sheets or panels, attached such that the panel or sheet resides approximately in the plane of the partition upon actuation of the cargo organizer to the curved stable state. These illustrations are an indication of the possibilities and is not to limit the scope of available configurations of individual cargo organizers.

Figure 2:
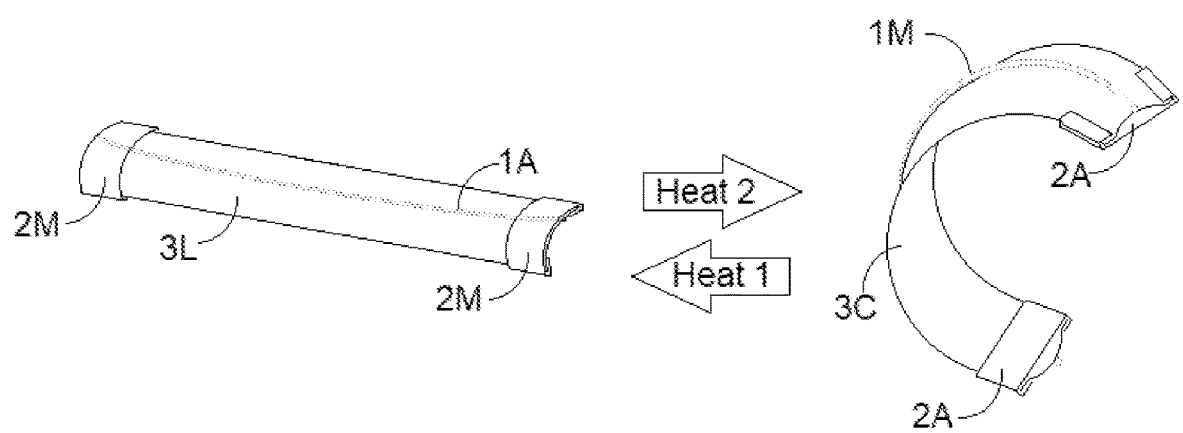
FIG. 2 shows a drawing of a bi-stable strip 3 in its elongated state 3L where a SMA wire 1A residing in its A phase and two SMA strips 2M reside in their M phase after heating wire 1 that converts to the bi-stable strip in the curved state 3C after heating the SMA strips 2 into their 2A phase to actuate the rolling of the bi-stable strip 3.
Figure 3J:
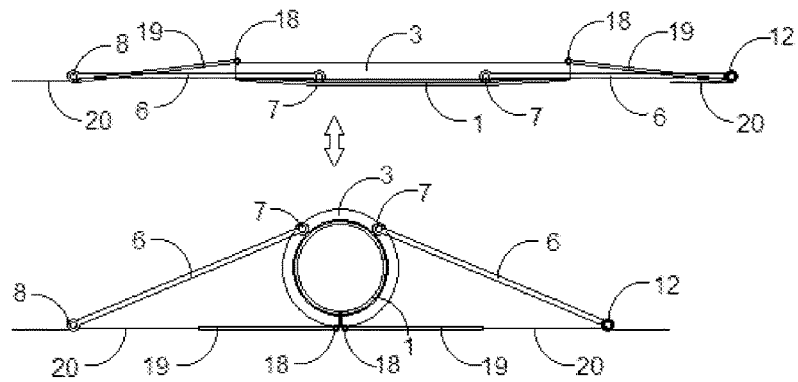
FIG. 3J shows a drawing of a cargo organizer in the form of a flat (elongated) bi-stable strip 3 attached to a SMA wire 1 that actuates transformation to the curved stable state upon receipt of current and actuates transformation to the elongated bi-stable state upon receipt of current through two SMA wires 19 attached to the ends of bi-stable strip 3 with a second strip hinge 18 connected to cords 20 that makes a fixed attachment with the floor of a compartment and has a first connecting rod 6 and fixed hinge 8 to the cargo compartment and attached to the bi-stable strip 3 through a first strip hinge 7 and a second connecting rod 6 that connects to a wheel 12 and attached to the bi-stable strip 3 through a second strip hinge 7, according to an embodiment.

Though shown with SMA actuators where the actuator is attached to two positions as in the SMA strip 2 illustrated in FIG. 2 or across two positions the SMA wire 1 illustrated in FIG. 2 and where the SMA strip 2 is used to actuate curvature and the SMA wire 1 is used to actuate elongation, the SMA actuator attachment and function is not so limited. As shown in FIG. 3J, a SMA wire 1 attached to two ends of the bi-stable strip 3 can be used to actuate curvature to the curved stable state and a pair of SMA wires 19 can be attached, each to one point on the bi-stable trip and another end ultimately attached to the cargo compartment.

Figure 4A:
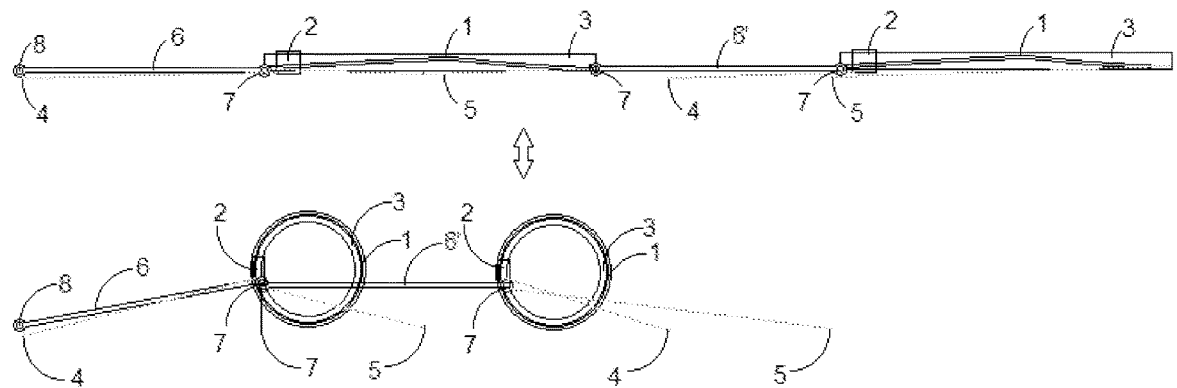
FIG. 4A shows a drawing of a cargo organizer comprising two bi-stable strips where a cargo organizer as shown in FIG. 3A includes a second connecting rod 6' connected by second strip hinges 7 to the first bi-stable strip 3 and a second bi-stable strip 3 SMA having a second SMA wire 1 and a second SMA strip 2 for reversible transformation of the second bi-stable strip 3 upon receiving a current through second conductors 4 and 5, according to an embodiment.
Figure 4B:
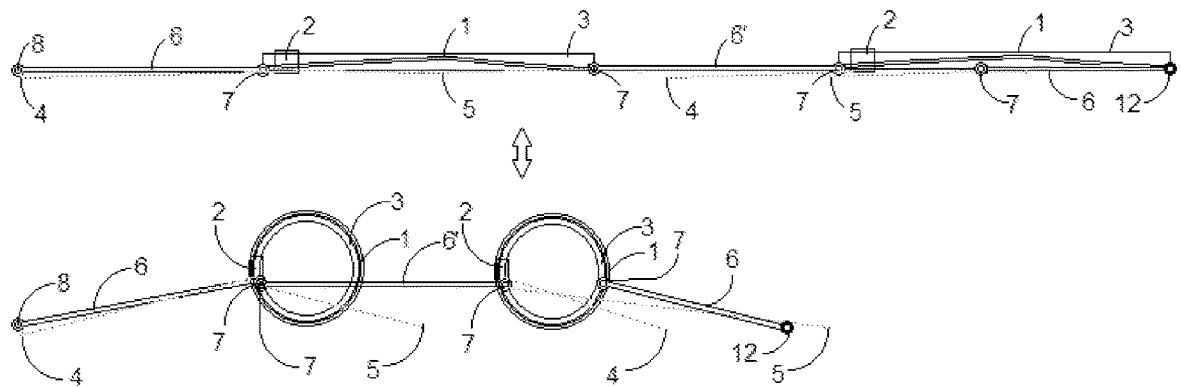
FIG. 4B shows a drawing of a cargo organizer comprising two bi-stable strips of FIG. 4A where the second bi-stable strip 3 is connected via a third connecting rod 6 that connects to a wheel 12 and attached to the bi-stable strip 3 through a third strip hinge 7, according to an embodiment.
Figure 4C:
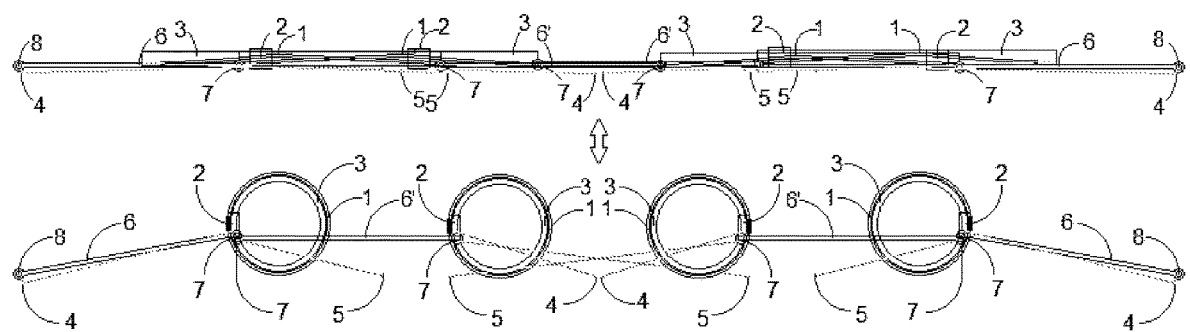
FIG. 4C shows a drawing of a composite cargo organizer comprises two cargo organizers as shown in FIG. 4A situated immediately adjacent to each other and where the points of attachment to the floor via fixed hinges 8 of the two cargo organizers is at the end points of the composite cargo organizer in both stable states, according to an embodiment of the invention.
Figure 4D:
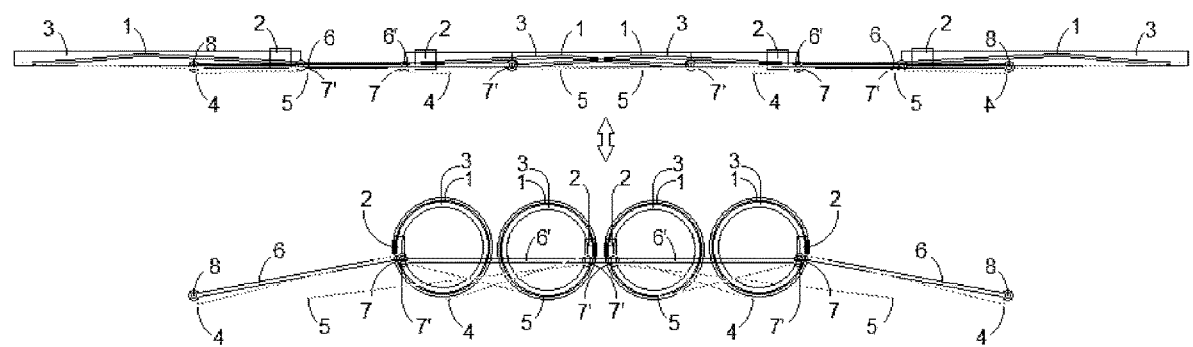
FIG. 4D shows a drawing of a composite cargo organizer comprises two cargo organizers as shown in FIG. 4A but where the points of attachment to the floor via fixed hinges 8 is located between the end and midpoint of the composite cargo organizer in the elongated state and at the end points in the curved state, according to an embodiment.
Figure 4E:
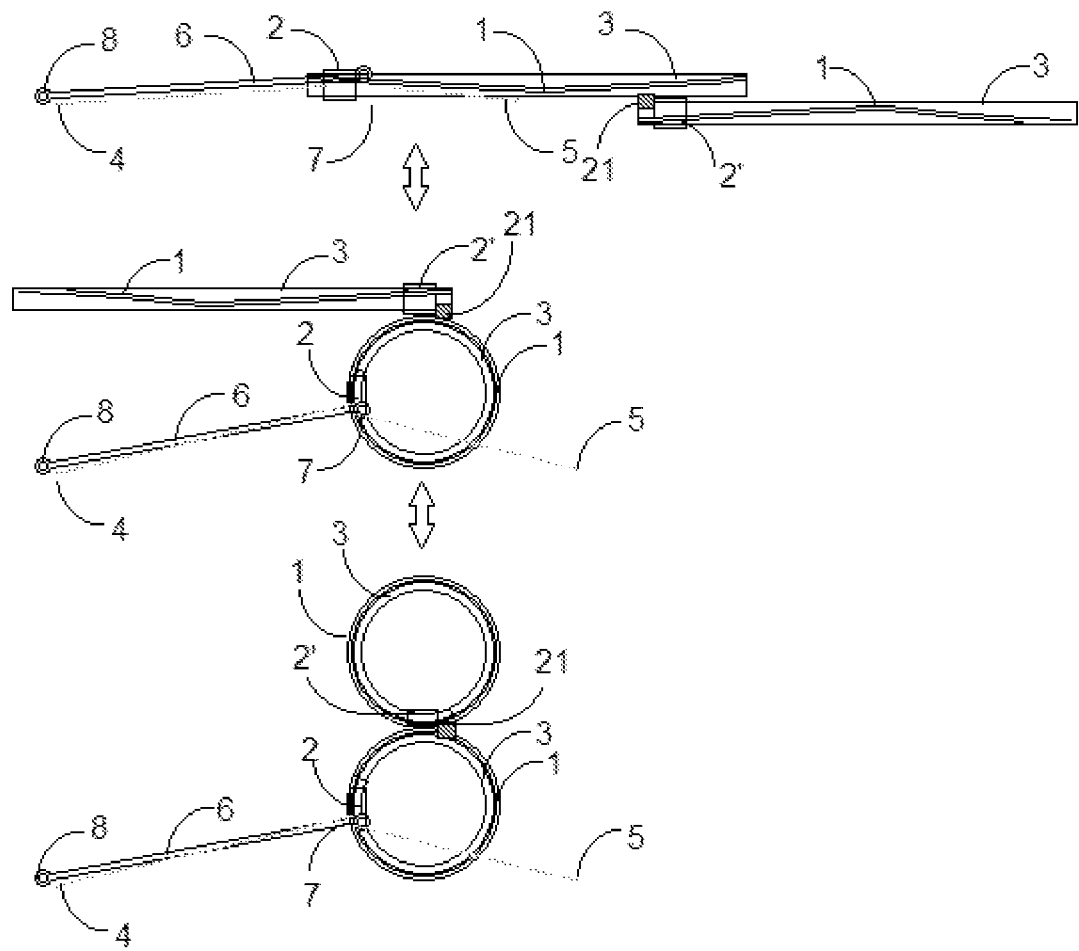
FIG. 4E shows a drawing of a cargo organizer comprising two bi-stable strips of FIG. 4A where the second bi-stable strip 3 is connected to a clamp 21 to the first bi-stable strip 3 where a second SMA strip 2' and a second SMA wire 1 allow a sequential activation by delivery of a current through a conductor (not shown) to form stacked curved stable states to form a high barrier for partitioning the cargo compartment, according to an embodiment.

The cargo organizer can be constructed of two or more coupled bi-stable strips fixed such that one rod has an end attached to the floor and other rods are attached between adjacent bi-stable strips where one or more of the bi-stable strips can be actuated to elevate portions of the coupled bi-stable strips independently such that only one or all bi-stable strips can be elevated based on the desired partitioning of the cargo compartment. As shown in FIG. 4A, in an exemplary embodiment, a rod 6 is attached directly to or within a surface of the trunk's floor and to a position on a first bi-stable strip 3 of the cargo organizer a second rod 6' is attached between the first bi-stable strip 3 and a second bi-stable strip 3. As shown in FIG. 4B, a third rod 6 can be attached to the second bi-stable strip 3 and to another portion of the trunks floor in a manner where the third rod 6 can translate across the floor in a channel, or it could telescopically contract and extend as needed during actuation. At least one of the rods is fixed in a manner that allows the rotational movement of the bi-stable strips' connecting rods free of interference by any other rods employed during actuation to allow the desired raising of the organizer from the trunk floor to partition the trunk. The attachment is in a manner that the organizer can contract to a shape that is effectively flat, where the bi-stable strip has some curvature perpendicular to its length and requires little or any of the volume that would be available for cargo absent the organizer. As with a single bi-stable strip, connections between a plurality of bi-stable strips can be by flexible strips, chains, or elastic connectors. By combining two of these cargo organizers, as a composite cargo organizer, the two can be situated on top of each other or immediately adjacent to each other and actuated sequentially or simultaneously to generate the composite trunk organizer where the multiple bi-stable strips share a single plane or adjacent planes to act as a single partitioning body. This is shown in FIG. 4C and FIG. 4D with an overlapping and an adjacent orientation, respectively. Although illustrated as pairs of bi-stable strips, three or more bi-stable strips and various combinations of rods, telescopic rods, chains, flexible strips, and elastomers can be employed. As shown in FIG. 4E, two bi-stable strips 3 as a cargo organizer are connected in a manner that they can be sequentially activated with an elevation that can be up to about the sum of their diameters. Bi-stable strips that actuate to various diameters or curvatures can be employed in any combination.

Figure 5A:
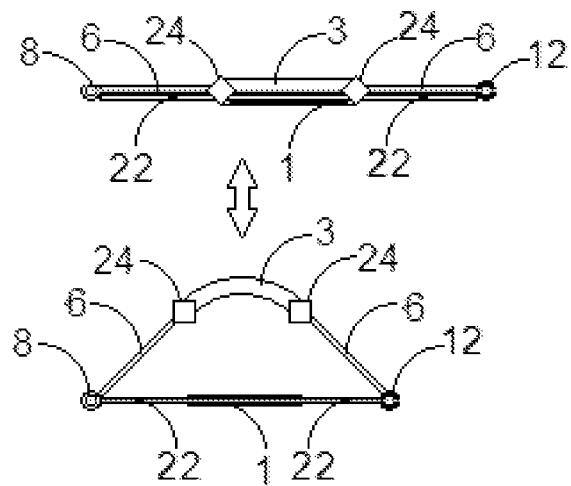
FIG. 5A shows a drawing of a cargo organizer in the form of a flat (elongated) bi-stable strip 3 attached to a SMA wire 1 connected to both ends of the bi-stable strip 3 by elastomeric connectors 22 that actuates transformation to a partially curved stable state upon receipt of current through a conductor 5 and actuates the transformation to the elongated bi-stable state manually with a pair of connecting rods 6 attached to the bi-stable strip 3 through non-rotatable studs 24 where one makes a fixed attachment with a compartment hinge 8 to the floor of a cargo compartment and the other to wheel 12, according to an embodiment.

In other embodiments, the bi-stable strip can transform between an extended state and a curved state where the curvature is a portion of a circle that is more than about 45° but less than about 270° or where the attachment of connecting rods is at a position of the bi-stable strip that is not at ends of the bi-stable strip. As shown in FIG. 5A, where one or both connecting rods 6 can telescope, is hinged, elastic, or can slide or roll on a wheel 12, the partition can be formed between two positions on the trunk bi actuation of a bi-stable strip that contracts to about 90° of a circle. As shown, one connecting rods 6 is fixed to the cargo compartment at one end and to a non-rotatable stud 24 and the other rod 6 connects a second stud 24 and a wheel 12 to roll, or alternatively to slide, along a channel to allow activation to raise and lower the cargo organizer. Activation by the heating of the SMA wire 1 can generate a force on the rods 6 by contracting the distance between the two ends of the rods 6 and not by a SMA actuator that is connected to both ends of the bi-stable strip 3. Although the length change of a straight SMA wire is in the range of about ten percent upon contraction, this is sufficient to initiate the transformation between the elongated stable state and the curved bi-stable state. The SMA wire 1 can be connected to the ends of the rods 6 by a cord or, as shown, with an elastomeric connector 22 that can extend to impart insufficient stress when stretched to actuate accidentally but aid in the contraction when SMA wire 1 when actuated to impose the curved stable state. The SMA can have a geometry that causes greater overall contraction relative to a straight wire, for example in the shape of a spring, to have that SMA feature contract sufficiently to accommodate a large displacement. As shown in FIG. 5A, the retraction to the elongated bi-stable state can be manually performed by pressing on the curved bi-stable strip.

Figure 5B:
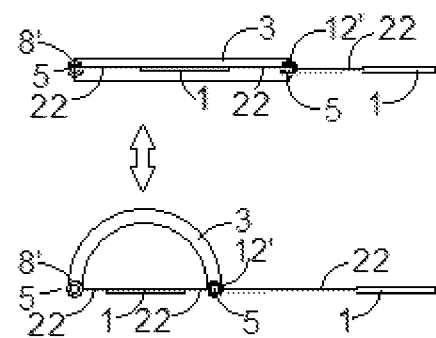
FIG. 5B shows a drawing of a cargo organizer in the form of a flat (elongated) bi-stable strip 3 attached to a first SMA wire 1 connected to both ends of the bi-stable strip 3 by two elastomeric connectors 22 where actuation transforms to a partially curved stable state upon receipt of current through a conductor 5 and actuates the transformation to the elongated bi-stable state by a second SMA wire 1" connected with a third elastomeric connector 22 attached to a movable end of the bi-stable strip 3, where one end of the bi-stable strip 3 is fixed to the floor of the cargo compartment by a fixed compartment hinge 8' and the other end of the bi-stable strip to wheel 12', according to an embodiment.

Activation of the transformation of the bi-stable state to the curved state can be performed, as shown in FIG. 5B, using a SMA wire 1 that is connected directly to the bi-stable strip 3 and via a fixed hinge 8' to the cargo compartment with a wheel 12' allowing actuation by rolling into a curved stable state that is 180° of a circle and where a second SMA wire 1 can promote the transformation to the elongated stable state when coupled with a cord or, as shown, an elastomeric connector 22 where the SMA wire 1 is connected to the cargo compartment, but alternatively can be connected to the bi-stable strip 3.

Figure 5C:
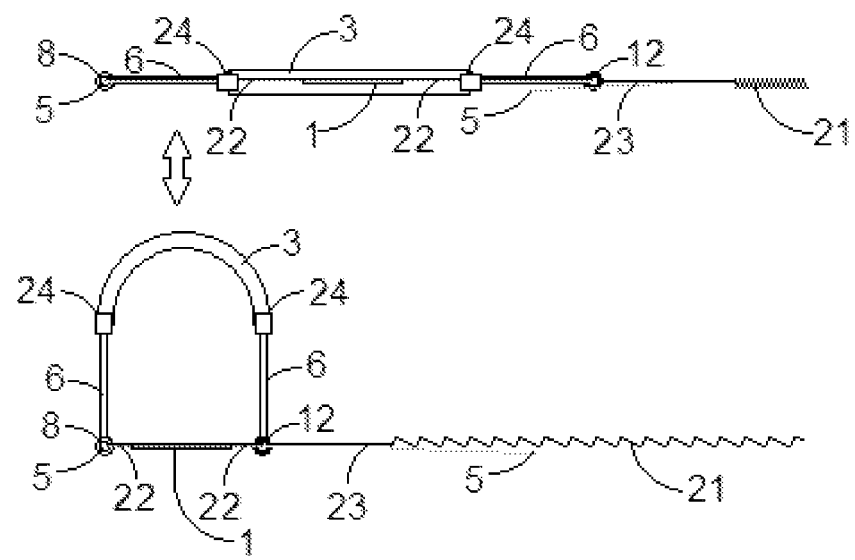
FIG. 5C shows a drawing of a cargo organizer in the form of a flat (elongated) bi-stable strip 3 with a pair of connecting rods 6 attached to the bi-stable strip 3 through non-rotatable studs 24 where one makes a fixed attachment with a compartment hinge 8 to the floor of a cargo compartment and the other to wheel 12 and attached to a SMA wire 1 connected to the connecting rods 6 through elastomer rod 22 near the compartment hinge 8 and the wheel 12 that actuates transformation to a partially curved stable state upon receipt of current through a conductor 5 and actuates the transformation to the elongated bi-stable state by a SMA spring 21 connected via a cord 23 to the connecting rod 6' near the wheel upon receipt of current through a conductor 5, according to an embodiment.
Figure 5D:
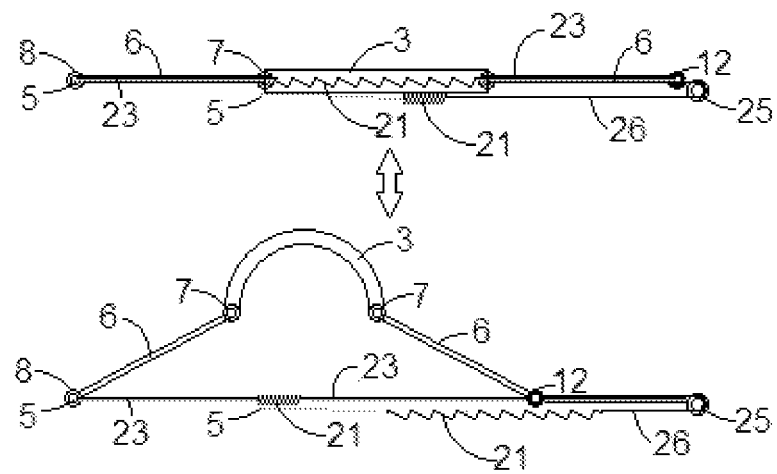
FIG. 5D shows a drawing of a cargo organizer in the form of a flat (elongated) bi-stable strip 3 with a pair of connecting rods 6 attached to the bi-stable strip 3 through strip hinges 7 where one makes a fixed attachment with a compartment hinge 8 to the floor of a cargo compartment and the other to wheel 12 and attached to a first SMA spring 21 through a pair of cords 23 that actuates transformation to a partially curved stable state upon receipt of current through a conductor 5 and actuates the transformation to the elongated bi-stable state by a second SMA spring 21 connected via a flexible cord 26 that is sufficiently flexible to wrap around an axle 25 to the connecting rod 6' near the wheel 12 upon receipt of current through a second conductor 5, according to an embodiment.

As illustrated in FIG. 5C, the height of the barrier upon actuation to the curved stable state can be accentuated by the connecting rods 6 amplifying the displacement from the floor. Neither of the actuators, SMA wire 1 and SMA spring 21 is directly connected to the bi-stable strip. The SMA wire 1 is connected to the ends of the rods 6 distal to the bi-stable strip 3 and the SMA spring 21 is connected to one rod 6 near wheel 12 that allows movement during the actuations. The SMA spring can be attached via a cord 23 as shown or, alternatively, can be attached via a rod, chain, or elastomeric connector. In contrast to the connection of the bi-stable strip 3 to the rods 6 via a stud 24 as shown in FIG. 5C, the connections can be a hinge 7, as shown in FIG. 5D to allow the rods to extend in the plane of the divider formed upon actuation to the sides with a degree that is greater than that which can be achieved with the fixed attachment of the rods 6 to the bi-stable strip 3. FIG. 3D shows the use of a flexible cord 26 attached to SMA spring 21 that is wound about an axle 25 or a pivot of sufficiently low friction such that the actuator can be embedded in a manner that the dimensions of the cargo compartment is not limiting on the positioning or displacement of the cargo organizer within the cargo compartment.

Figure 5E:
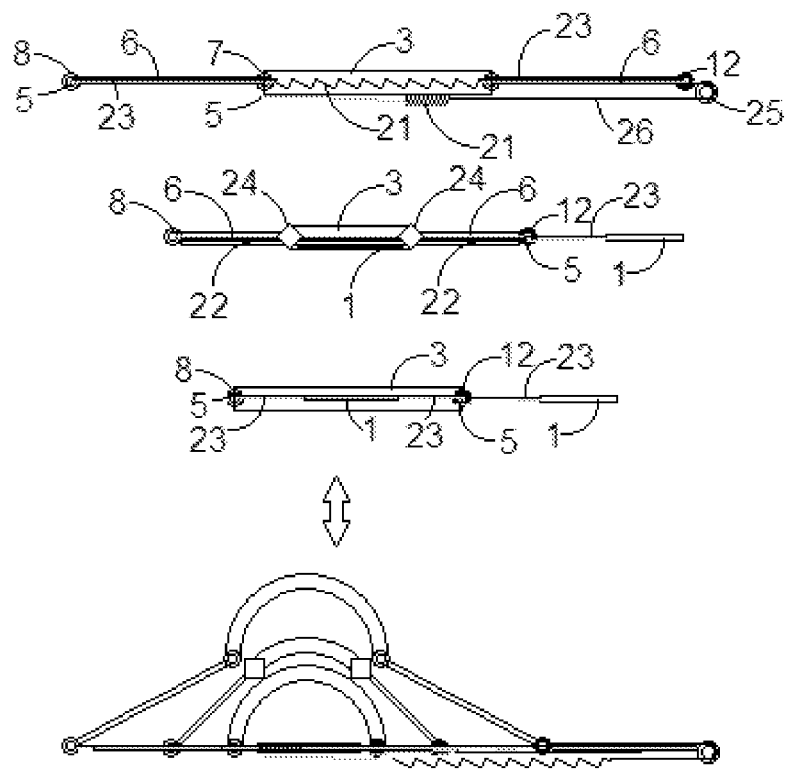
FIG. 5E shows a drawing of a stacked composite cargo organizer where cargo organizers as illustrated in FIG. 5B, FIG. 5C, and FIG. 5D are stacked for sequential actuation to form a dense barrier upon actuation to the curved stable state, according to an embodiment.

A composite cargo organizer can be constructed of two or more bi-stable strip and SMA actuators can be combined into a single cargo organizer. As illustrated in FIG. 5E, three bi-stable strips of 180°, 90°, and 180°, as shown in FIG. 5A, FIG. 5B, and FIG. 5D, can be stacked to give a significant amount of mass within the partitioning plane, where the stacked elongated (flat) stable state cargo organizers are expanded for appreciation of the mechanisms and illustrated in the curved stable state without the labels shown in FIG. 5A, FIG. 5B, and FIG. 5D to indicate the continuity of barrier to cargo movement that is possible by stacking of cargo organizers into a composite cargo organizer.

Figure 6A:
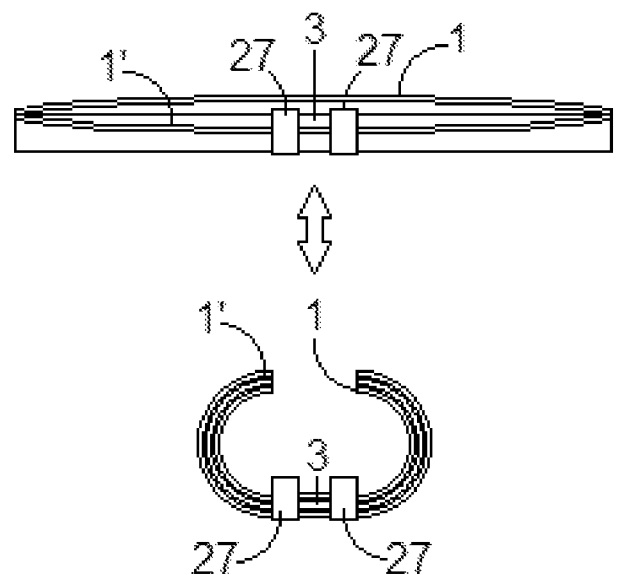
FIG. 6A shows a drawing of a cargo organizer in the form of a flat (elongated) bi-stable strip 3 with a pair of anchoring brackets 27 to fix the cargo organizer to the floor of the cargo compartment and with a pair of SMA wires 1 and 1' for actuation between the curved and elongated states upon providing a current, according to an embodiment.
Figure 6B:
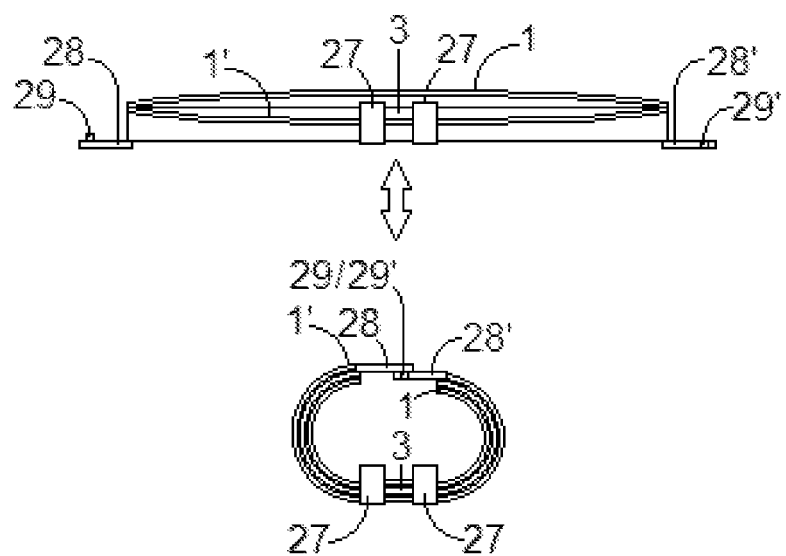
FIG. 6B shows a drawing of a cargo organizer of FIG. 6A that is modified to include a pair of locking extending arms 28 and 28' having a pin 29 and a hole 29' to lock the extensions upon activation to the curved state for barrier stabilization, according to an embodiment.

In an embodiment, the cargo organizer is fixed to at least one point of the cargo compartment directly to at least on point of the bi-stable strip where upon actuation by a SMA actuator, the rise of a separated feature from a single bi-stable strip occurs. As shown in FIG. 6A, a bi-stable strip 3 is attached at two positions by two brackets 27 not at the ends of the bi-stable strip 3. Any additional points between these two positions on the bi-stable strip can be sites of additionally attachment or the two brackets can be combined as a single longer attachment bracket. No rods, chains, elastic strips, or any other attachment is required to partition the trunk by the activated bi-stable strip. As shown in FIG. 6B, the bi-stable strip 3 can include extending arms 28 and 28' plates connecting the ends of the bi-stable strip via complementary pin(s) 29 and hole(s) 29' on the extending arms 28 and 28', respectively. Although shown without one or more hinges, an extending arm, for example extending arm 28 can be connected to the bi-stable strip 3 via a hinge such that the rate it traverses space and achieves its final position is less than the opposing extending arm 28' such that their coming together does not inhibit achieving the desired connection.

Figure 6C:
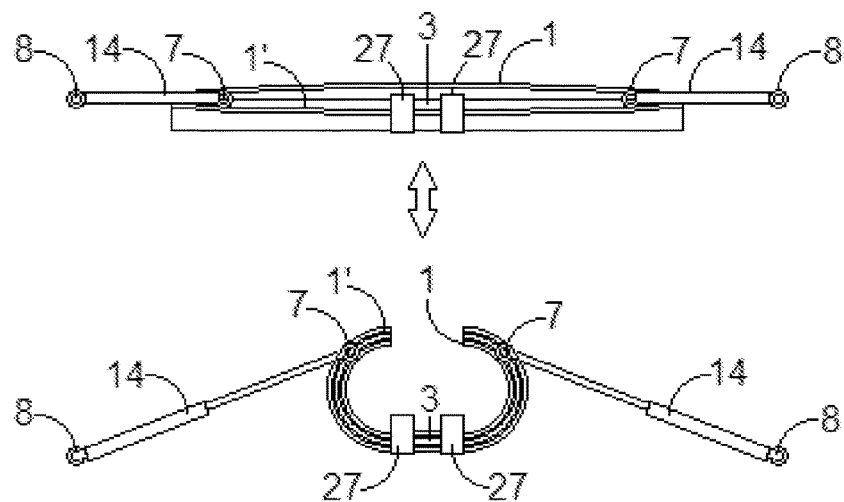
FIG. 6C shows a drawing of a cargo organizer in the form of a flat (elongated) bi-stable strip 3 with a pair of anchoring brackets 27 to fix the cargo organizer to the floor of the cargo compartment and with a pair of SMA wires 1 and 1' for actuation between the curved and elongated states upon providing a current where portions of the bi-stable strip 3 are connected via strip hinges 7 to telescopic rods 14 to fixed compartment hinges 8, according to an embodiment.
Figure 6D:
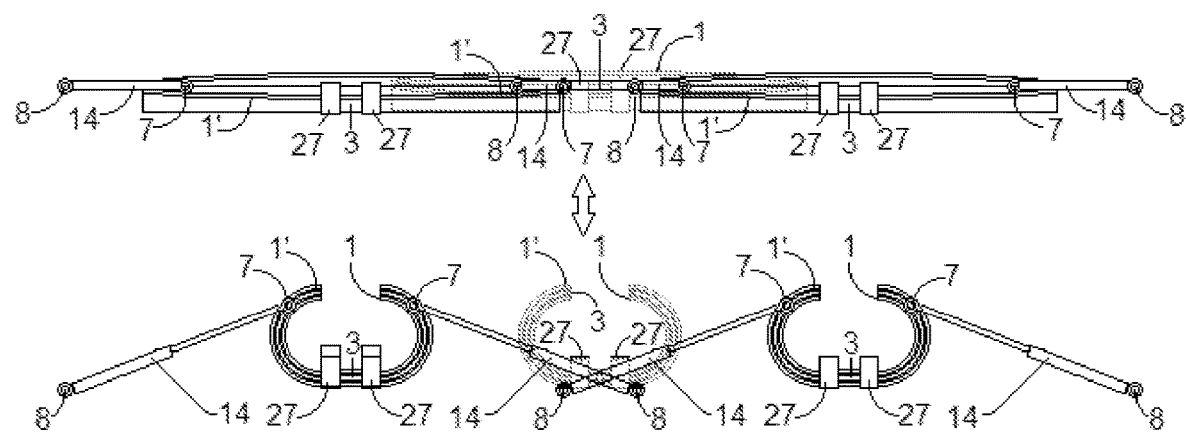
FIG. 6D shows a drawing of a composite cargo organizer where two cargo organizers as illustrated in FIG. 6C are combined with a cargo organizer illustrated in FIG. 6A where the cargo organizers can be stacked and actuated sequentially or positioned immediately adjacent to each other and actuated sequentially or simultaneously, according to an embodiment.

As shown in FIG. 6C, the cargo organizer can also include rods, chains, elastomers, or other attachments, shown as telescopic rods 14, that are connected by hinges 7 on the bi-stable strip 3 and by a compartment hinge 8 on the floor or a side of the cargo compartment. One or both telescopic rods 14 can be replaced with elastomeric rods, chains, or connected to a wheel or can slide in a channel to further augment the separation of the cargo compartment by an extension of the structure to one or more sides of the bi-stable strip 3. The cargo organizer can be a composite organizer that includes two or more bi-stable strips, where these bi-stable strips can be partially overlapping in the elongated stable state, where the sequential SMA actuation can coordinate the rising of the individual bi-stable strips to avoid any undesired physical interference during actuation of a plurality of bi-stable strips. For example, as shown in FIG. 6D, a first elongated bi-stable strip, as illustrated in FIG. 6C, can be situated partially on top of a second elongated bi-stable strip, as illustrated in FIG. 6C, where both can be positioned over a cargo organizer as illustrated in FIG. 6A. The combined bi-stable strips construct a more complete barrier to shifting of the cargo out of the partitioned volume than a single bi-stable strip.

Figure 7A:
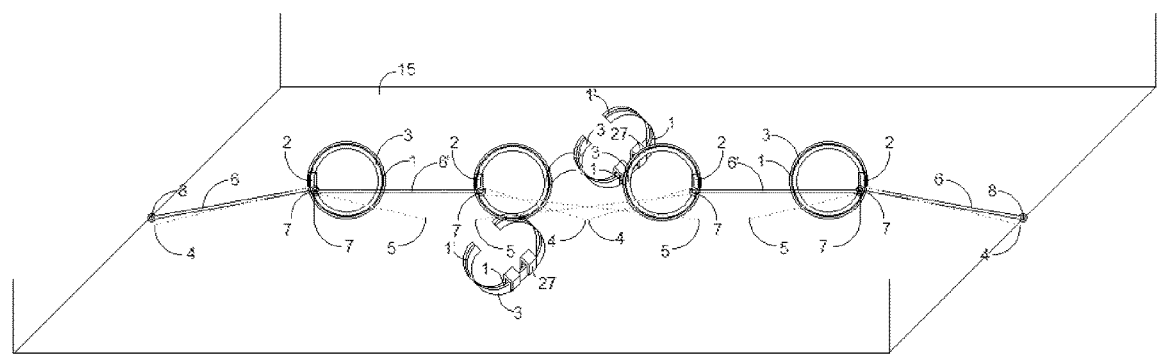
FIG. 7A shows a drawing of a cargo compartment that includes two cargo organizers as illustrated in FIG. 4A and two cargo organizers as illustrated in FIG. 6A where the cargo organizers are illustrated in their curved stable state such that the cargo organizer can be partitioned into two equal portions front to back or side to side, four equal portions, or three inequal portions, according to an embodiment.

Further, the present disclosure provides a method of organizing a cargo compartment by actuating at least one SMA actuator that imposes a force that promotes the transformation from one stable state of a bi-stable strip to the other stable state. Upon actuation, partitions are established that rise from a base, sides, and or top of a trunk or other cargo compartment. The actuation requires less than about a second to a few seconds to form the stable partition from a cargo organizer. The cargo organizers require little or none of the volume of the cargo compartment in its fully unpartitioned state, where the organizers are in an elongated, nearly flat strip that reside on or within a surface of the cargo compartment with little or no protrusion into the maximum unpartitioned volume. Cargo organizers can be placed in a manner where they can be activated simultaneously or sequentially, For example, a first or first set of cargo organizers attached to the floor of a trunk can be actuated to partition the left and right sides of the trunk and then an actuation of a second or second set cargo organizer attached to the floor perpendicular to the first or first set of organizers can partition the trunk from front to back into, for example, four quadrants, as shown in FIG. 7A where a composite cargo organizer as illustrated in FIG. 4C can partition the cargo compartment front to back and two additional cargo organizers, as illustrated in FIG. 6A, partition the cargo organizer side to side. By selective actuation, the cargo compartment can be partitioned into two, three, or four sections where the two sections can be of equal or unequal size and the three sections can be of two equal dimensions and one larger section in two different manners depending on the choice of actuation.

Figure 7B:
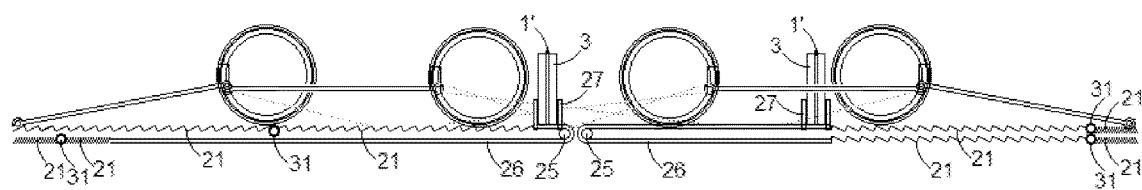
FIG. 7B shows a drawing of a cargo compartment that includes two cargo organizers as illustrated in FIG. 4A and two cargo organizers as illustrated in FIG. 6A where the cargo organizers are illustrated in their curved stable state where the cargo organizer illustrated in FIG. 6A are modified to include a means of positioning them along the floor by an additional pair of actuators shown as two pairs of SMA springs 21 with spring connector 31 where one pair is directly connected to an anchoring bracket 27 and the other pair is connected to the anchoring bracket 27 via a flexible cord 26 that winds about an axle 25, according to an embodiment.

The cargo organizers, as shown in FIG. 7B as a front view of a modification of the cargo compartment shown in FIG. 7A, has the front and back cargo organizers of the style illustrated in FIG. 6A augmented to be movably attached to the trunk's floor in a manner that the position can be modified at will, either manually, or as illustrated for movement of cargo organizers, by use of one or more additional actuators that can be, but is not necessarily, SMA actuators. FIG. 7B illustrates each bracket 27 of the two cargo organizers where s attached on one side by a flexible cord 26 to a pair of SMA springs 21 coupled by a spring connector 31 and attached on the opposing side to a pair of SMA springs 21 coupled by a spring connector 31. By selectively actuating the SMA springs, the cargo organizers can be independently positioned to three position, where the left (front) cargo organizer is positioned distal to a side wall by having both SMA springs 21 attached to the flexible cord actuated and the right (back) cargo organizer in a mid-position where one SMA spring 21 of the pair attached directly to the bracket 27 and one SMA string attached to the flexible cord 26 are actuated. A third position proximal to the side wall is not illustrated where both SMA springs 21 attached to the flexible cord 26 are actuated is not shown. The number of adjustable positions increases as a function of coupled SMA springs, wires, or other actuator forms are attached to each side of the bracket. The use of a flexible cord is not required and coupled springs can be situated directly on both sides of the brackets. Various other modes for adjusting the positioning of the cargo organizers in the trunk are possible, such as the attachment to one or more belts or plates to a bracket of any size to translate the cargo organizers on or within the floor and allow the positioning of the cargo organizers to any desired position. Though illustrated to translate the cargo organizer parallel to the axis of the curved stable state, the cargo organizers can be translated perpendicular to the axis, in line with the elongated state. Multiple cargo organizers can be moved independently within the matrix of the combined cargo organizers to partition the cargo compartment in an almost endless number of ways.

Figure 8A:
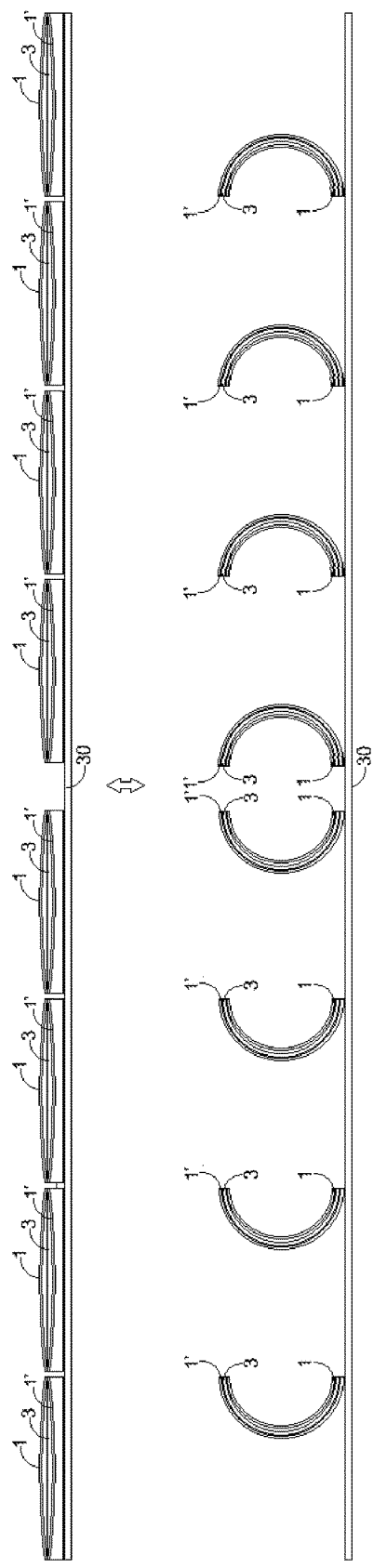
FIG. 8A shows a drawing of a coupled cargo organizer where one end of a plurality of bi-stable strips 3 are fused to a common anchoring distributer 30 that upon actuation of one of SMA wires 1 and 1' individual bi-stable strips transform between its elongated stable state and its curved stable state, according to an embodiment.
Figure 8B:
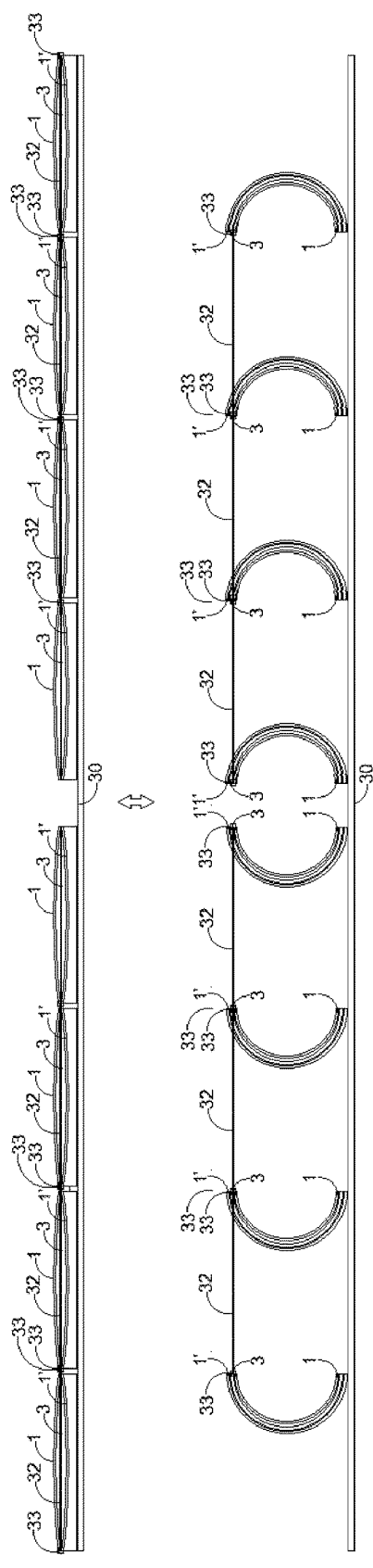
FIG. 8B shows a drawing of a coupled cargo organizer as illustrated in FIG. 8A that is augmented to include connecting elastic strips 32 between adjacent bi-stable strips 3 and connecting hinges 33 thereto, according to an embodiment.

Partitioning in numerous different ways can be allowed by a grid of coupled cargo organizers. FIG. 8A shows a coupled cargo organizer in the form of a strip where individual bi-stable strips with their two SMA wire 1 and 1' actuators are fixed to a base 30 that can be on or embedded within the floor of the cargo compartment. The individual bi-stable strips can be actuated independently although illustrated where all are in an elongated stable state or a curved stable state to form a continuous partition across the strip, which can extend from one side wall to its opposing sidewall. By independently actuation different partitions in different areas of the cargo compartment can be reversibly constructed as desired. FIG. 8B shows the coupled cargo organizer of FIG. 8A modified to include a strip, such as, but not necessarily, an elastic strip 32 that is situated between attached vial connecting hinges 33 such that upon actuation to the curved stable state an additional barrier element is within the plane perpendicular to the axis of the curved bi-stable strips 3. Though not shown, when a single bi-stable strip is actuated, a nearly perpendicular strip extends from the base of the coupled cargo organizer of a non-actuated bi-stable strip to the full height of the curved bi-stable strip to form an additional barrier element upon actuation.

Figure 8C:
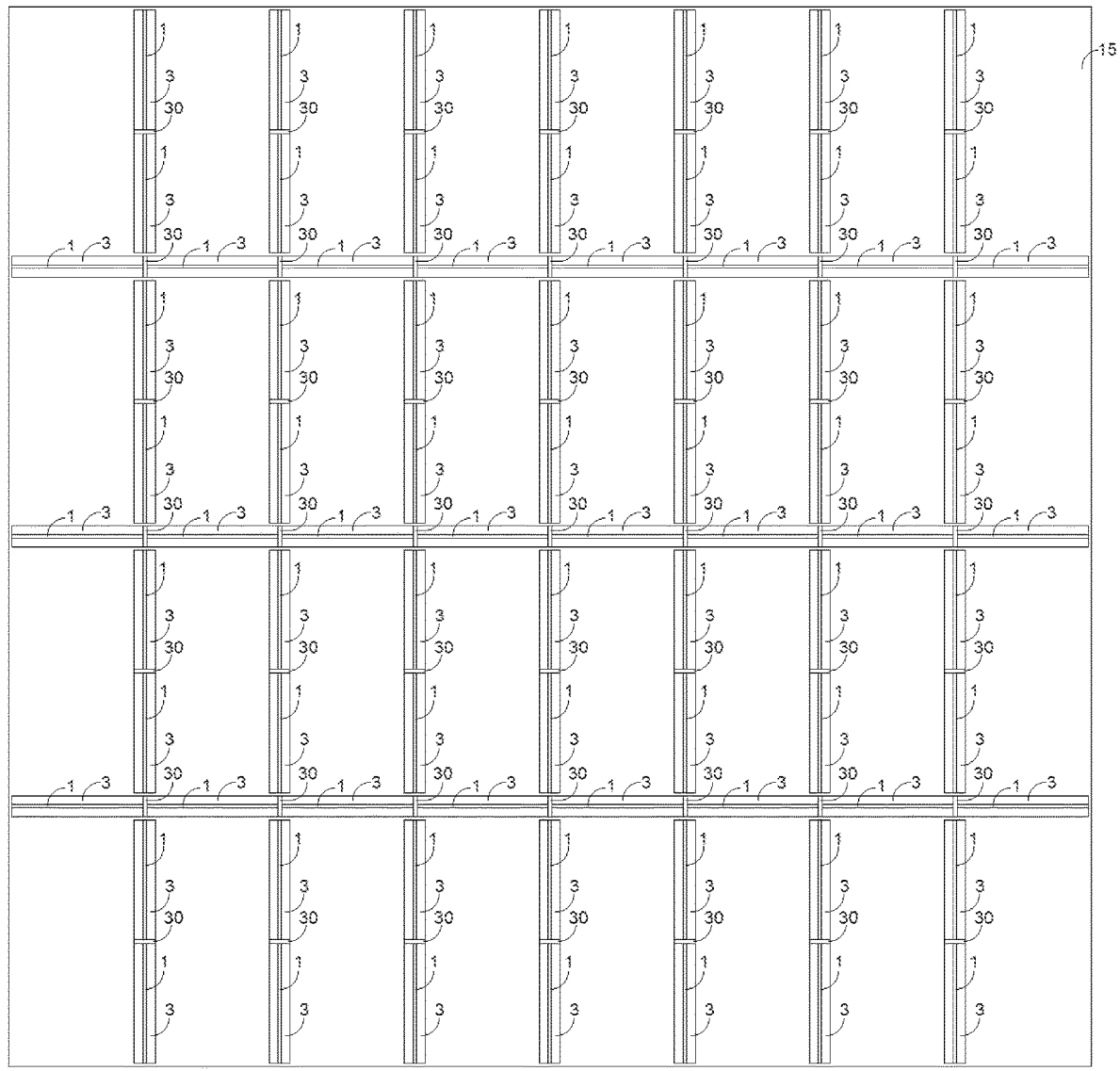
FIG. 8C shows a base layout of an effectively square cargo compartment 15 using multiple cargo organizers of the strip type of FIG. 8A where three coupled cargo organizers of eight bi-stable strips and twenty-eight coupled cargo organizers of two bi-stable strips 3 equally dispersed between the eight bi-stable strip coupled cargo organizers, according to an embodiment.

FIG. 8C shows a base layout of an effectively square cargo compartment that can be partitioned using coupled cargo organizers as illustrated in FIG. 8A at three positions front to back and where three coupled cargo organizers of eight bi-stable strips 3 are at three positions front to back twenty-eight coupled cargo organizers of two bi-stable strips 3 make multiple partitions side to side such that the cargo compartment can be portioned into one to 32 portions where the size and shape of the proportions can vary depending upon the number and position of bi-stable strips actuated. The view in FIG. 8C can be that of a mat for placement on the floor of a cargo organizer that can be connected to, for example, existing wiring in the vehicle to turn on a trunks light and contain a control unit within the mat to direct actuation of the SMA actuators from a remote device.

Figure 9A:
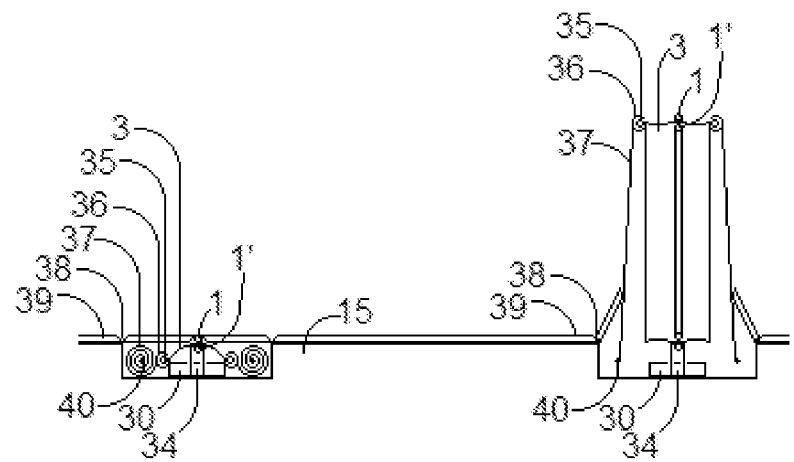
FIG. 9A shows a cross section of two cargo organizer of the type shown in FIG. 8A that shows two parallel bi-stable strips 3 in an elongated (flat) stable state (left) and a curved stable state (right) where the strip distributers 30 are recessed into the floor of the cargo compartment 15 with fixing studs 34 connecting the bi-stable strips 3 to the distributers 30 and with spherical slides 35 residing in a tubular channel 36 and attached to the bi-stable strips 3, the tubular channels 36 attached to rolled panels 37 attached to axles 40, and where a thin mat 39 resides on the floor and includes notched hinges 38 to allow the rise of the bi-stable strips 3 and panels 37, according to an embodiment of the invention.

FIG. 9A shows a cross section of two cargo organizer of the type shown in FIG. 8A recessed into the floor of the cargo compartment 15 where fixing studs 34 attaches the bi-stable strips 3 to the distributer 30. Each bi-stable strip has a pair of spherical slides 35 attached to both sides of the bi-stable strip 3 at the end that will elevate upon actuation.

Figure 9B:
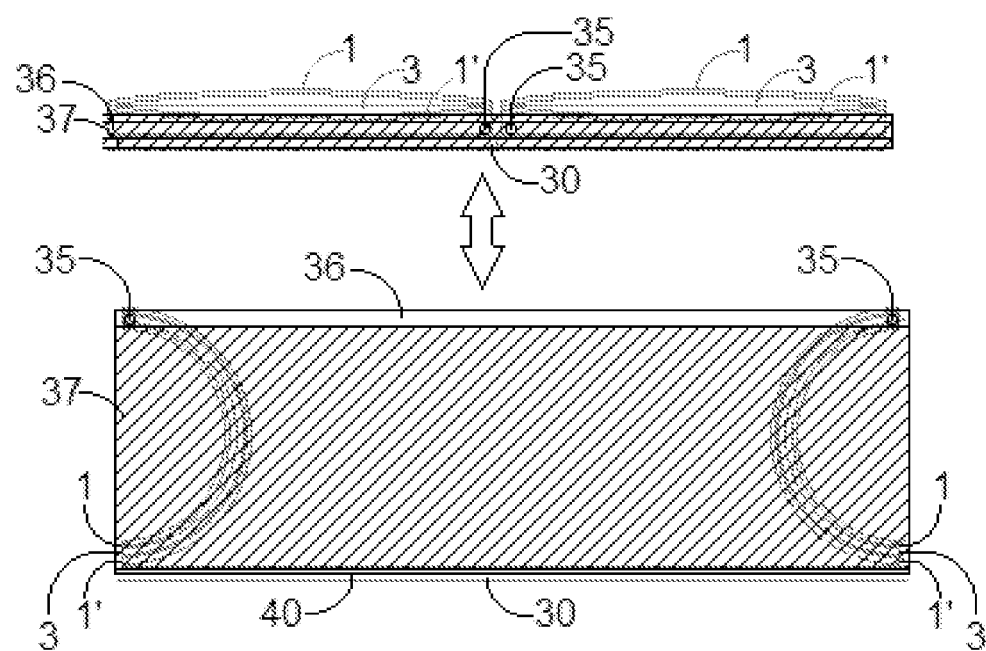
FIG. 9B shows a coupled cargo organizer where two bi-stable strips 3 are attached to a strip distributer 30, spherical studs 35 in tubular channel 36 with panels 37 that form a continuous rectangular barrier upon actuation to the curved stable state, according to an embodiment.

The spherical slides 35 resides and can translate within tubular channels 36 such that upon activation each spherical slide 35 moves through the channel 36 from one end to the other and draws a rolled panel 37 on an axle 40 up from the floor to the full height of the cargo organizer in the curved stable state to form a continuous partition from a coupled cargo organizer strip. A thin mat 39, for example, but not limited to, a polypropylene or polyethylene mat resides on the floor, where the mat includes a pair of notched hinges 38 for each strip of bi-stable strips to allow the rise of the continuous barrier on actuation to the curved stable state. By having a panel 37 of sufficiently flexibility individual bi-stable strips 3 can be activated with a fan shaped barrier extending from an adjacent elongated state bi-stable strip 3 to the bi-stable strip in the curved stable state. As shown in FIG. 9B, by having two bi-stable strips 3 attached to the distributer 30 at the distal ends and including attached panels 37 rectangular barriers can be formed from each coupled cargo organizer upon actuation of both bi-stable strips effectively simultaneously. Although illustrated with the bi-stable strip being a half circle in the curved state, any orientation and completeness of a circle can be attached to a panel. In addition to the ability to traverse the cargo organizers parallel and perpendicular to the cargo organizer, the orientation can be on the diagonal or other orientation of the cargo compartment base. The point of attachment of a cargo organizer can also reside on a fixable axis to allow rotation to any angle to allow a few cargo organizers to be selectively placed at any position in the cargo compartment. Complementary cargo organizers can extend from the lid of the trunk and the floor of the trunk to complete a barrier from top to bottom of the cargo compartment upon closing the cargo compartment.

In another aspect, the present teachings provide a vehicle having a trunk or other cargo component that can be organized into compartments partitioned from the full volume to one with one or more barriers to movement of cargo with transformation upon actuation of a cargo organizer. The trunk's cargo organizer(s) convert the trunk from a single open compartment by forming barriers that restrict cargo to one portion of the trunk with a transformation of the single compartment to plural compartments in seconds by actuation of the cargo organizers. The cargo organizer is actuated by the application of an electrical current. By switching on a controlled current, one or more SMA components of the cargo organizer undergoes joule heating of the SMA to cause a transformation of a M phase to an A phase such that the with the shape change is imposed by the SMA placing a force on a bi-stable strip to cause the coiling of a bi-stable strip. Prior to the activation of the SMA component, the cargo organizer resides on or within the trunk's floor, walls, or lid.

In addition to a metal SMAs, the actuators can be a SMA equivalents that can be actuated between an elongated and contracted state. The SMA equivalent can be a coiled shape memory composite (SMC) of an engineering thermoplastic, such as nylon, and an anisotropic carbon material such, as a carbon fiber (CF) or carbon nanotube (CNT). The spring shaped SMC can be reversibly contracted or elongated by heating or cooling the composite. A heater can be placed within the coil or exterior to the coil.

The entire cargo organizer can be electrically and thermally insulated by applying a rubber coating over the SMA actuators, bi-stable strips, and electrical connectors, and any bases, distributers, or any other portion that can be fully coated and retain the ability to move independently during actuation. The elastomers can be any rubber capable of surviving the repeated abrasion that can occur from placing cargo in the cargo compartment and any small movement within the partitions once actuated or when acting as a base in the elongated (flat) stable state.

Figure 10:
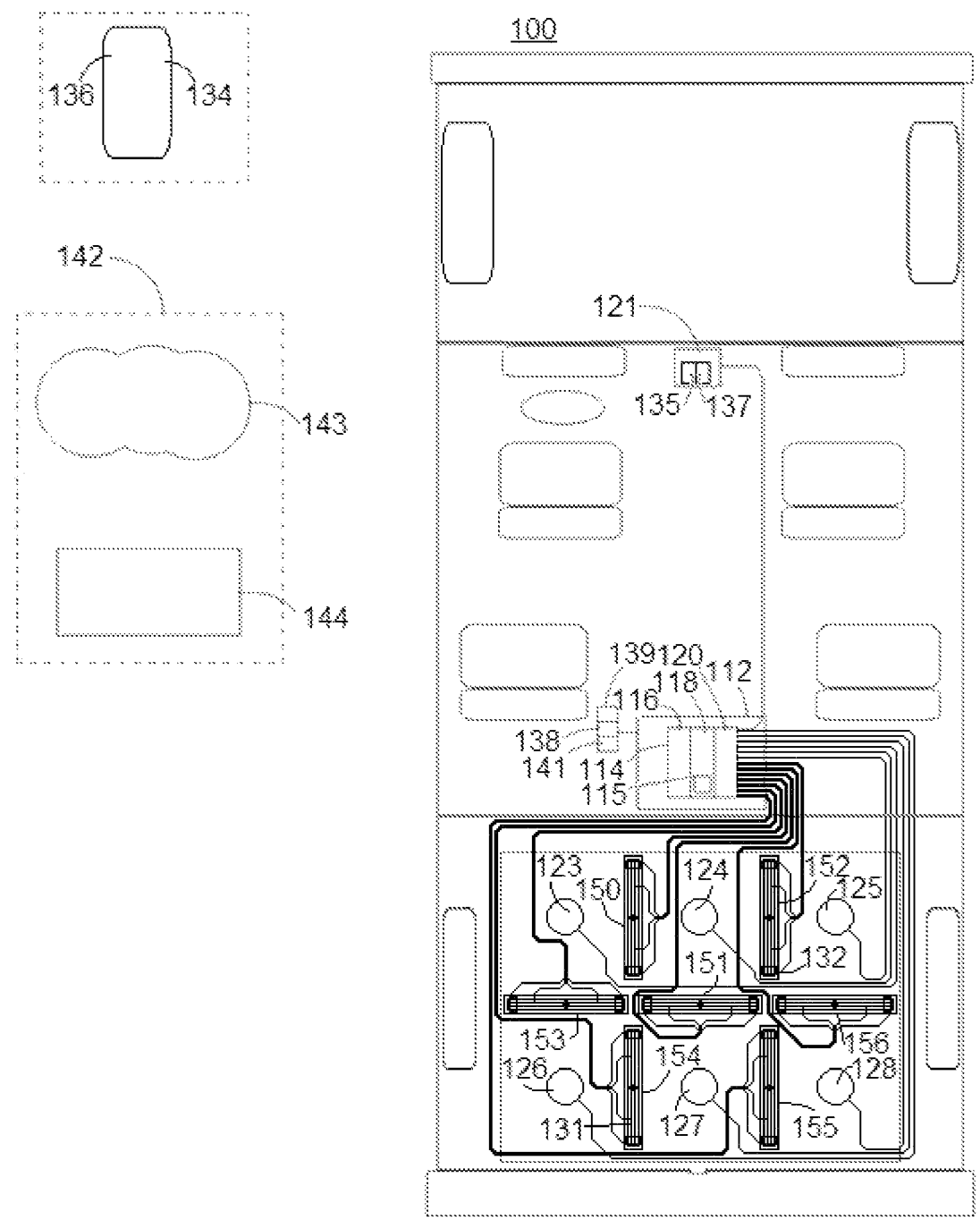
FIG. 10 is an exemplary schematic view illustrating a vehicle with a cargo compartment including seven cargo organizers of two bi-stable strips having a plurality of sensors to detect cargo.

With reference to FIG. 10, the vehicle including a cargo compartment with cargo organizers can include a vehicle controller or vehicle control system 112, which generally includes a at least one control module 114 with at least one processor 116, at least one data store or memory 118, and at least one interface system 120. The control module 114 and/or processor 116 can be a portion of a central vehicle control, as part of an input sensor 112. In one or more aspects, the processor(s) 116 can be a main processor of the vehicle. For instance, the processor(s) 116 can be an electronic control unit (ECU). The data store 118 can include volatile and/or non-volatile memory. Examples of suitable data stores 118 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 118 can be a component of the control module 114 or processor(s) 116, or the data store 118 can be operatively connected, either directly or indirectly connected, to the processor(s) 116 for use thereby. The data store 118 may contain the algorithms or operational software 115 required to correlate the desired organizer pattern and the direction of which actuators of the cargo organizers, for example actuators 131 and 132 of cargo organizers 150 through 157 to be powered.

In various aspects, the interface system 121 can be configured to work as a combination, with portions that may be referred to as an input system and an output system. An input system 134 and/or 135, and output system 136 and/or 137 includes any device, component, element or aspect or groups thereof that enable information/data to be entered into or received from a machine. The input system can receive an input from a vehicle passenger through various known devices. An output system 136 or 137 includes any device, component, or arrangement or groups thereof that enable information/data to be presented to a vehicle passenger through various known output devices and/or displays. The input and output systems of the interface system 120 may also facilitate a coordinated operation with other systems, such as the input from sensors 124, 125, 126, and/or 127 and other vehicle systems. The control module 114 can be in communication with another control module of the vehicle and output signals to actuators for the cargo organizers, to switch between and select the stable states of the bi-stable strips of each cargo organizer or portion thereof and optionally the orientation and position of the cargo organizer.

In one or more aspects, the vehicle 100 may include one or more internal communication system 138 including at least one communication module/device 138 configured to send/receive communications between various vehicle components and vehicle systems, including the sensors 123 through 128 for input of the presence or absence of cargo and provide a signal to direct actuation of cargo organizers 150 through 157 if desired. In various aspects, the communication module/device 138 may be configured to be able to work with wireless technology for sending/receiving communication. In various aspects, the communication system 139 may also include one or more output system devices 136, configured to receive via a receiver device 141 wireless communications from external devices, such as personal electronics devices. In other aspects, the present technology may be used with hardware and/or software located at remote locations 142 such that an anticipated cargo can be mapped for placement in the cargo compartment and its efficient orientation within the cargo compartment. The remote location 142 may include a cloud server 143 or remote network 144 that communicates with the vehicle 110 using various known technologies, such as GPS service, cellular communication, or similar. In various aspects, a user may have a personal electronic device or personal communication device, such as a phone, tablet, or other smart device that can be configured to use a specific application, or "app," to communicate with at least one communication system 134/136 to remote entry or exchange data or information related to the present technology, including for example, receiving push notifications, text messages, instant messages, and the like.

The foregoing description is provided for purposes of illustration and description and is in no way intended to limit the disclosure, its application, or uses. It is not intended to be exhaustive or to limit the disclosure. Individual elements or components of a particular embodiment are generally not limited to that embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure and are not intended to limit the disclosure of the technology or any aspect thereof. The recitation of multiple embodiments having stated components is not intended to exclude other embodiments having additional components, or other embodiments incorporating different combinations of the stated components.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or components does not exclude other embodiments of the present technology that do not contain those elements or components.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment.

It should be also understood that the various method steps discussed herein do not have to be carried out in the same order as depicted, and not each method step is required in each aspect or embodiment.

What is claimed is:

1. A cargo organizer comprising:
   at least one bi-stable strip; and
   at least one actuator comprising a shape memory alloy (SMA) or an SMA equivalent for each of the at least one bi-stable strip, wherein the at least one bi-stable strip reversibly forms a barrier in a cargo compartment and the at least one actuator is positioned on the at least one bi-stable strip parallel to a length of the at least one bi-stable strip or perpendicular to the length of the at least one bi-stable strip.

2. The cargo organizer according to claim 1, wherein the SMA or SMA equivalent is a Ni—Ti alloy(nitinol), Cu—Ni—Ti alloy, Cu—Zn—Al alloy, Cu—Al—Ni, alloy, or a composite comprising a polymer, carbon nanotubes, and carbon fibers.

3. The cargo organizer according to claim 2, wherein the polymer comprises nylon 6-6 or nylon 6.

4. The cargo organizer according to claim 1, wherein the actuator is a wire or a strip.

5. The cargo organizer according to claim 4, wherein the wire or strip is a coiled wire or a coiled strip.

6. The cargo organizer according to claim 1, further comprising an electrical connection to the actuator comprising a SMA.

7. The cargo organizer according to claim 6, further comprising an electrical switch.

8. The cargo organizer according to claim 7, wherein the electrical switch is activated remotely.

9. The cargo organizer according to claim 1, further comprising a heater contacting the SMA or SMA equivalent and an electrical connection to the heater.

10. The cargo organizer according to claim 1, further comprising at least one connector comprising a ridged rod, flexible rod, elastomeric rod, telescopic rod, cord, chain, brace, or any combination thereof, wherein the connector is attached to at least one of the at least one bi-stable strip.

11. The cargo organizer according to claim 10, wherein the connector connects the at least one bi-stable strip to the cargo compartment.

12. The cargo organizer according to claim 10, wherein the at least one bi-stable strip is a plurality of bi-stable strips and the connector resides between at least two of the plurality of bi-stable strips.

13. The cargo organizer according to claim 10, wherein the connector is attached to the at least one bi-stable strip and/or to the cargo compartment by a hinge.

14. A cargo compartment comprising a cargo organizer comprising:
    at least one bi-stable strip;
    at least one actuator comprising a shape memory alloy (SMA) or an SMA equivalent for each of the at least one bi-stable strip, the at least one actuator being a coiled wire or a coiled strip; and
    at least one connector between the cargo organizer and at least one surface of the cargo compartment.

15. The cargo compartment according to claim 14, wherein the cargo compartment is a trunk or bed of a motor vehicle.

16. The cargo compartment according to claim 14, wherein the cargo organizer comprises a positioner situated perpendicular to a long axis of the bi-stable strip, the positioner comprising at least one rail or at least one channel on or within the at least one surface of the cargo compartment, wherein the cargo organizer is movable along the positioner.

17. A method of reversibly forming a barrier to partition a cargo compartment, comprising:
activating a first transformation of at least one cargo organizer from a flat stable state to a curved stable state, wherein the at least one cargo organizer is attached to at least one surface of a cargo compartment to form a barrier extending from a floor, a wall, or a roof of the cargo compartment with partitioning at least one portion of the cargo compartment into at least two volumes, the at least one cargo organizer comprising:
at least one bi-stable strip;
at least one actuator comprising shape memory alloy (SMA) or an SMA equivalent for each bi-stable strip; and
at least one connector between the at least one cargo organizer and at least one surface of the cargo compartment, wherein activating the first transformation comprises:
switching on a first electrical current;
electrically heating a first actuator to a transformation temperature of its SMA for:
contracting the SMA or an SMA equivalent;
imposing a first force on the bi-stable strip in the flat stable state that causes the first transformation to the curved stable state; and
switching off the first electrical current; and
activating a second transformation of the at least one cargo organizer from the curved stable state to the flat stable state wherein the barrier contracts into or onto the floor, the wall, or the roof of the cargo compartment to restore the portion of the cargo compartment to a single continuous volume, wherein activating the second transformation comprises:
pressing on the bi-stable strip manually; or
switching on a second electrical current;
electrically heating a second actuator to the transformation temperature of its SMA for;
contracting the SMA or the SMA equivalent; and
imposing a second force on the bi-stable strip in the curved stable state that causes the second transformation to the flat stable state.

18. The method according to claim 17, further comprising moving the at least one cargo organizer, wherein the at least one cargo organizer further comprises a positioner situated perpendicular to a long axis of the bi-stable strip, the positioner comprising at least one rail or at least one channel on or within the surface of the cargo compartment, wherein moving is along the rail or the channel of the positioner.

19. The method according to claim 17, wherein the switching is activated remotely.

* * * * *